United States Patent
Ono

(10) Patent No.: US 11,185,989 B2
(45) Date of Patent: Nov. 30, 2021

(54) VIRTUAL CREATURE CONTROL SYSTEM AND VIRTUAL CREATURE CONTROL METHOD

(71) Applicant: SONY CORPORATION, Tokyo (JP)

(72) Inventor: Hideyuki Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 349 days.

(21) Appl. No.: 16/305,100

(22) PCT Filed: Mar. 8, 2017

(86) PCT No.: PCT/JP2017/009337
§ 371 (c)(1),
(2) Date: Nov. 28, 2018

(87) PCT Pub. No.: WO2017/212723
PCT Pub. Date: Dec. 14, 2017

(65) Prior Publication Data
US 2020/0039078 A1    Feb. 6, 2020

(30) Foreign Application Priority Data
Jun. 6, 2016    (JP) .............................. JP2016-112922

(51) Int. Cl.
*G05B 19/18* (2006.01)
*B25J 9/00* (2006.01)
(Continued)

(52) U.S. Cl.
CPC ......... *B25J 11/0005* (2013.01); *B25J 9/0003* (2013.01); *G06K 9/00288* (2013.01)

(58) Field of Classification Search
CPC .... B25J 11/003; B25J 11/0005; B25J 9/0003; G06K 9/00295; G06K 2009/00328;
(Continued)

(56) References Cited

U.S. PATENT DOCUMENTS

| | | | |
|---|---|---|---|
| 6,650,965 B2 * | 11/2003 | Takagi | G06N 3/008 700/245 |
| 2002/0098879 A1 * | 7/2002 | Rheey | A63H 11/00 463/1 |

(Continued)

FOREIGN PATENT DOCUMENTS

| | | |
|---|---|---|
| JP | 11-65964 A | 3/1999 |
| JP | 2001-306145 A | 11/2001 |

(Continued)

OTHER PUBLICATIONS

International Search Report dated May 30, 2017 in PCT/JP2017/009337 filed on Mar. 8, 2017.

*Primary Examiner* — B M M Hannan
(74) *Attorney, Agent, or Firm* — Oblon, McClelland, Maier & Neustadt, L.L.P.

(57) ABSTRACT

A virtual creature control system, including: a communication unit configured to receive information of current states of a plurality of virtual creatures and transmit a signal for controlling operations of the plurality of virtual creatures, at least one virtual creature among the plurality of virtual creatures being hardware; and a control unit configured to generate a signal for controlling an operation of the at least one virtual creature among the plurality of virtual creatures such that the plurality of virtual creatures are not visually recognized at a same time by a specific user and control the communication unit such that the signal is transmitted to the one virtual creature. The virtual creature control system and virtual creature control method can control the plurality of virtual creatures in conjunction and promote indirect communication among a plurality of spots using the virtual creatures.

18 Claims, 19 Drawing Sheets

(51) Int. Cl.
*B25J 11/00* (2006.01)
*G06K 9/00* (2006.01)

(58) Field of Classification Search
CPC ........... G06K 9/00302; G06K 9/00335; G06K
9/00342; G06K 9/00348; G06K 9/00362;
G06K 9/00369; G06K 9/00389; G06K
9/00382; G06K 9/00288; G06K 9/00664;
G06K 9/00771; A63F 13/30; A63F 13/52;
A63F 13/825; A63H 30/04; A63H 11/00
USPC .......................................... 700/245–248, 250
See application file for complete search history.

(56) References Cited

U.S. PATENT DOCUMENTS

| | | | |
|---|---|---|---|
| 2003/0023347 A1* | 1/2003 | Konno | B25J 9/1671 700/245 |
| 2003/0074107 A1* | 4/2003 | Noma | G06N 3/006 700/245 |
| 2003/0080989 A1* | 5/2003 | Matsuda | G06F 3/0481 715/706 |
| 2003/0109959 A1* | 6/2003 | Tajima | G06N 3/008 700/245 |
| 2003/0187547 A1* | 10/2003 | Naka | G06F 1/26 700/245 |
| 2003/0191560 A1* | 10/2003 | Yokoo | A63H 11/00 700/245 |
| 2004/0210347 A1* | 10/2004 | Sawada | G06N 3/008 700/246 |
| 2005/0171640 A1* | 8/2005 | Sabe | A63H 11/00 700/245 |
| 2005/0272504 A1* | 12/2005 | Eguchi | A63F 13/10 463/40 |
| 2006/0271798 A1* | 11/2006 | Tandon | G06F 1/3203 713/300 |
| 2007/0111795 A1* | 5/2007 | Choi | A63F 13/825 463/42 |
| 2007/0213872 A1* | 9/2007 | Matsuzaki | G06N 3/008 700/245 |
| 2009/0024249 A1* | 1/2009 | Lee | G06N 3/126 700/245 |
| 2009/0149991 A1 | 6/2009 | Sumida et al. | |
| 2009/0248200 A1 | 10/2009 | Root | |
| 2011/0086702 A1* | 4/2011 | Borst | A63F 13/73 463/30 |
| 2012/0212427 A1* | 8/2012 | Li | G06F 3/03545 345/173 |
| 2013/0103360 A1* | 4/2013 | Hsu | G06F 16/583 703/1 |
| 2016/0236096 A1* | 8/2016 | Trzecieski | A63F 13/537 |

FOREIGN PATENT DOCUMENTS

| | | |
|---|---|---|
| JP | 2003-6532 A | 1/2003 |
| JP | 2004-33624 A | 2/2004 |
| JP | 2005-111603 A | 4/2005 |
| JP | 2005-111637 A | 4/2005 |
| JP | 2005-279828 A | 10/2005 |
| JP | 2009-136967 A | 6/2009 |
| JP | 2010-231698 A | 10/2010 |
| WO | WO 2009/105131 A1 | 8/2009 |

\* cited by examiner

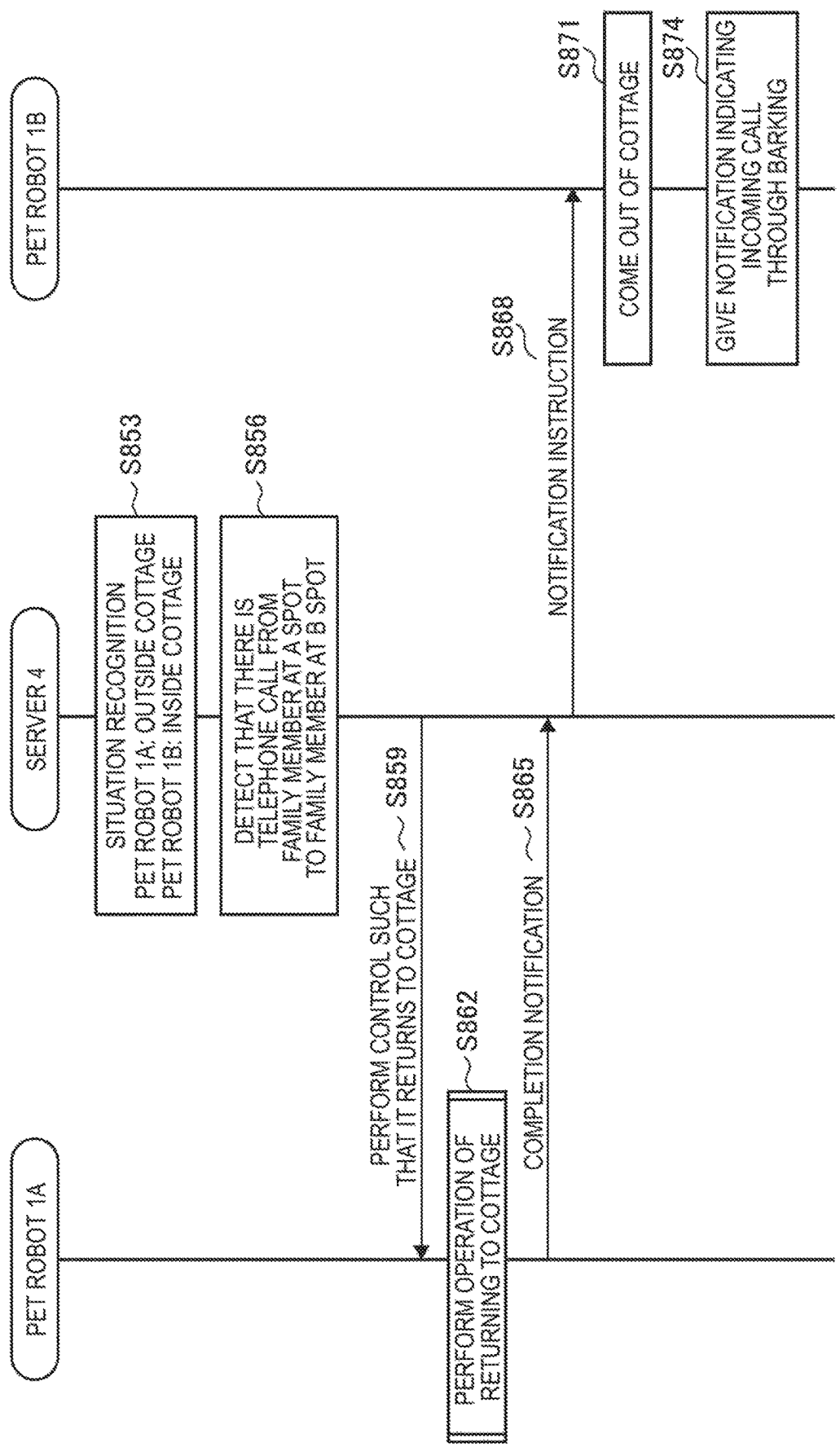

VIRTUAL CREATURE CONTROL SYSTEM AND VIRTUAL CREATURE CONTROL METHOD

TECHNICAL FIELD

The present disclosure relates to a virtual creature control system and a virtual creature control method.

BACKGROUND ART

For family members living at remote sites, it is important to have means of communication, and direct communication means between remote sites such as telephones, video phones, mail, message applications, and the like are already used.

Further, in recent years, service providing systems using robots or communication with robots have been proposed. For example, a network robot system in which a robot, a robot router (mobile terminal) that controls the robot, and a space manager that manages a robot in a space and detects environments inside and outside the space are provided in each of a plurality of spaces, and it is possible to perform a dynamic response as attribute information of a user is associated with environment information is disclosed in Patent Literature 1. In such a system, the robot router can manipulate the robot in another space outside the space on the basis of a control scenario, and, for example, a user carrying the robot router can also control a robot at home or the like while at work.

Further, a system in which an autonomous robot associates various kinds of knowledge information used for control with knowledge IDs and manages servers is disclosed in Patent Literature 2. Accordingly, in a case in which an operation state of the first robot is a predetermined state (for example, a failure state), knowledge information of the first robot is allocated to a second robot, and thus it is possible to easily perform robot exchange.

Further, a transceiving device that performs transmission and reception of e-mails with animation display as if a pet were coming and going to deliver letters on a GUI screen imitating the insides of both transmitting and receiving rooms, and virtually raises an electronic pet displayed in the form of animation is disclosed in Patent Literature 3.

PATENT LITERATURE

Citation List

Patent Literature 1: JP 2005-111637A
Patent Literature 2: JP 2005-111603A
Patent Literature 3: JP H11-65964A

DISCLOSURE OF INVENTION

Technical Problem

However, the robots in a plurality of spots are recognized as individual robots which are independently located at the respective spots, and recognition in which users in a plurality of spots are in contact with the same virtual creature is unable to be implemented.

In this regard, it is desirable to propose a virtual creature control system and a virtual creature control method which are capable of controlling a plurality of virtual creatures in conjunction and promoting indirect communication among a plurality of spots using the virtual creatures.

Solution to Problem

According to the present disclosure, there is proposed a virtual creature control system, including: a communication unit configured to receive information of current states of a plurality of virtual creatures and transmit a signal for controlling operations the plurality of virtual creatures, at least one virtual creature among the plurality of virtual creatures being hardware; and a control unit configured to generate a signal for controlling an operation of the at least one virtual creature among the plurality of virtual creatures such that the plurality of virtual creatures are not visually recognized at a same time by a specific user and control the communication unit such that the signal is transmitted to the one virtual creature.

According to the present disclosure, there is proposed a virtual creature control system, including, a plurality of virtual creatures, at least one virtual creature among the plurality of virtual creatures being hardware; a communication unit configured to receive information of current states of the plurality of virtual creatures and transmit a signal for controlling operations of the plurality of virtual creatures; and a control unit configured to generate a signal for controlling an operation of the at least one virtual creature among the plurality of virtual creatures such that the plurality of virtual creatures are not visually recognized at a same time by a specific user and control the communication unit such that the signal is transmitted to the one virtual creature.

According to the present disclosure, there is proposed a virtual creature control method, including, causing, by a processor, a communication unit to receive information of current states of a plurality of virtual creatures and transmit a signal for controlling operations the plurality of virtual creatures, at least one virtual creature among the plurality of virtual creatures being hardware; and generating, by the processor, a signal for controlling an operation of the at least one virtual creature among the plurality of virtual creatures such that the plurality of virtual creatures are not visually recognized at a same time by a specific user and controlling the communication unit such that the signal is transmitted to the one virtual creature.

Advantageous Effects of Invention

As described above, according to the present disclosure, it is possible to control a plurality of virtual creatures in conjunction and promote indirect communication among a plurality of spots using the virtual creatures.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 19 is a sequence diagram illustrating an operation control process of giving a communication occurrence notification through a pet robot according to the present embodiment.

MODE(S) FOR CARRYING OUT THE INVENTION

Figure 1:
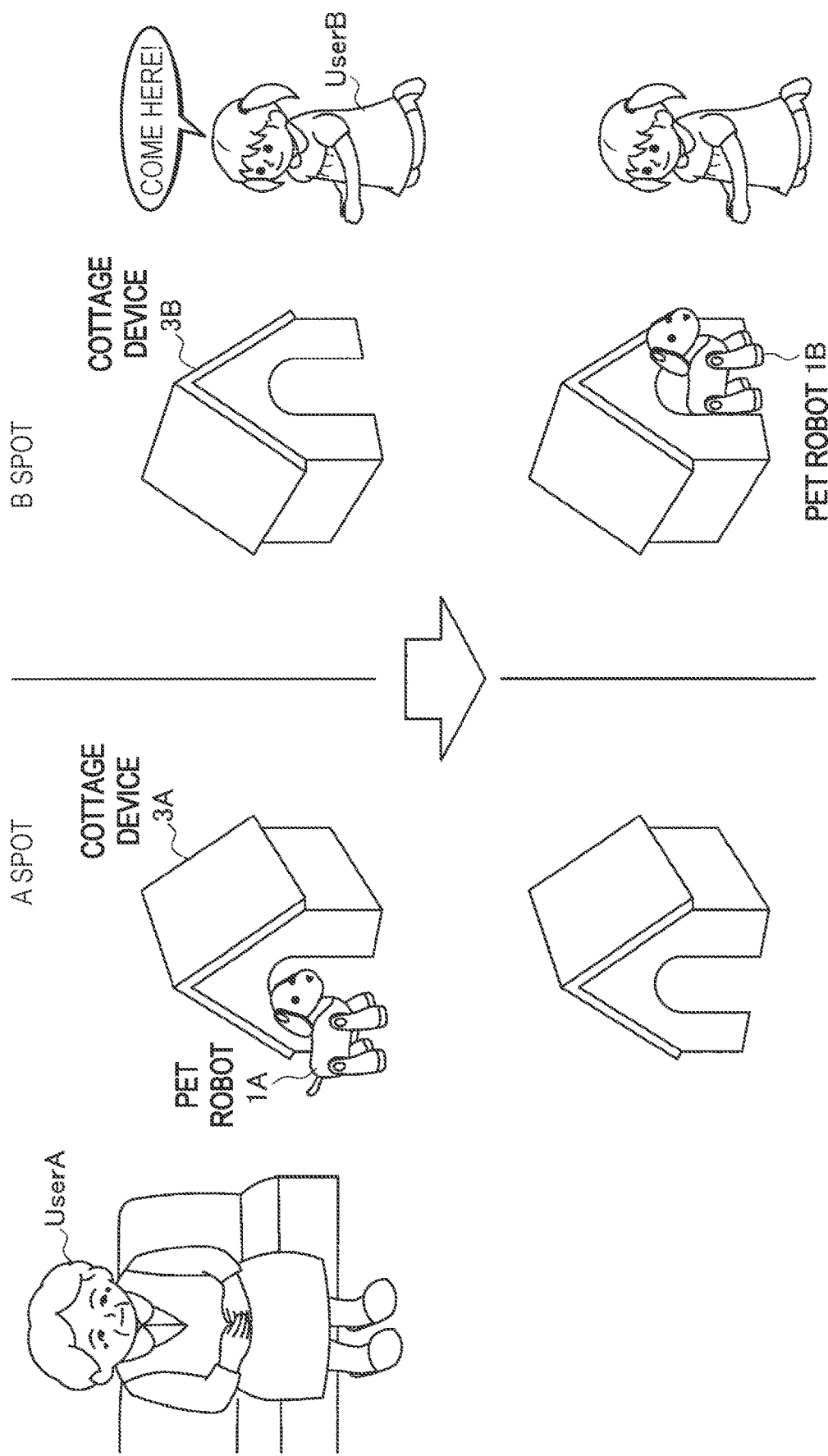
FIG. 1 is a diagram illustrating an overview of an information processing system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Overview of information processing system according to one embodiment of present disclosure
2. Configuration
2-1. Construction of pet robot
2-2. Configuration of cottage device
2-3. Configuration of server
3. Operation process
3-1. Cooperative operation control at remote site
3-2. Control of operation of returning to cottage
3-3. User registration
3-4. Operation control according to call from family member
3-5. Operation of acting charming
3-6. Discipline control
3-7. Operation of bringing object to remote site
3-8. Effect in which weather is considered
3-9. Operation control according to presence or absence of nearby person
3-10. Operation control according to visually recognized situation
3-11. Operation control according to communication between plurality of spots
4. Conclusion 1. Overview of Information Processing System According to One Embodiment of Present Disclosure First, an overview of an information processing system according to one embodiment of the present disclosure will be described. FIG. 1 is a diagram for describing an overview of an information processing system according to the present embodiment. As illustrated in FIG. 1, in the information processing system (virtual creature control system) according to the present embodiment, pet robots 1 (1A and 1B) and cottage devices 3 (3A and 3B) that accommodate the pet robots 1 are provided at a plurality of spots such as an A spot and a B spot. The pet robot 1 is a robot device having an entertainment property in which an appearance shape thereof is formed by imitating an animal such as a dog and is used as an example of a virtual creature in this specification. Further, the pet robot 1 can autonomously cause the eyes, the legs, or the like to operate and express animal-like gestures. Further, the cottage device 3 is an example of an accommodating unit that accommodates the pet robot 1.

Background

Here, with respect to communication between family members, for example, in a case in which a pet such as a dog or a cat is raised by a family, the pet becomes a topic between family members, or family members can share the same experience through the pet, and thus the pet plays a role of promoting communication indirectly. However, one pet is helpful for promoting indirect communication only in a case in which the family members are living in the same place, and it is difficult to raise one pet between remote sites.

In this regard, in the information processing system according to the present embodiment, server management is performed so that a plurality of pet robots arranged at remote sites are visually recognized physically as one pet robot at the same time, and thus it is possible to cause it look as if one pet is shared and raised between remote sites regardless of remote sites.

For example, as illustrated in FIG. 1, when the pet robot 1A is playing with a user A at an A spot, if a user B at a B spot calls, the pet robot 1A enters the cottage device 3A and disappears from a field of view of the user A, and then the pet robot 1B accommodated in the cottage device 3B at the B spot comes out of the cottage device 3B. As described above, the pet robot 1A and the pet robot 1B are prevented from being visually recognized by the user A and the user B at the same time, and thus it is possible to cause the users to recognize one pet robot being raised by the plurality of users, and the pet robot 1 becomes a topic between the user A and the user B (for example, a grandmother and a grandchild living apart from each other), so that communication is promoted.

Figure 2:
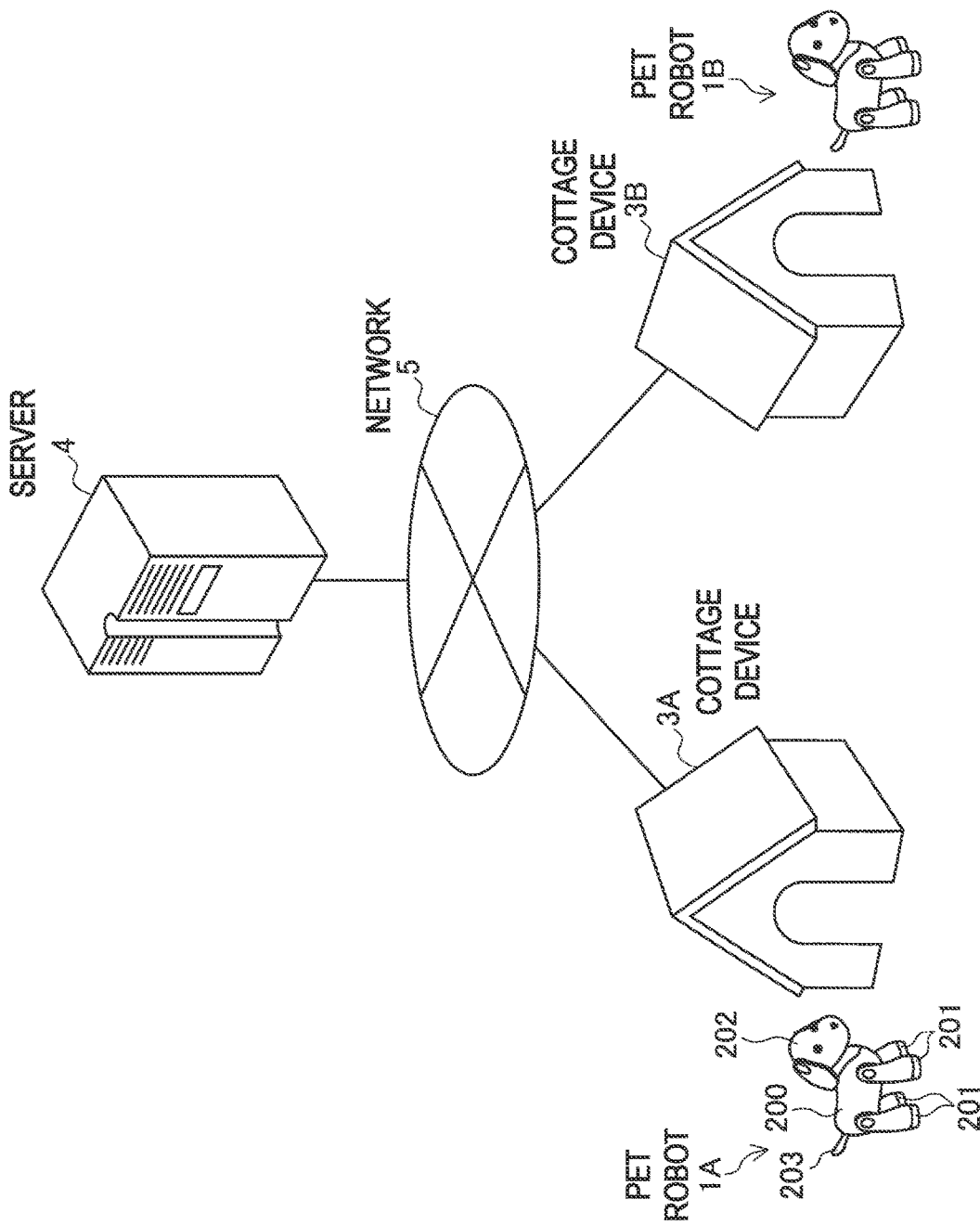
FIG. 2 is a diagram illustrating an overall configuration of an information processing system according to the present embodiment.

Next, an overall configuration of the information processing system according to the present embodiment which controls the pet robots 1A and 1B will be described with reference to FIG. 2. FIG. 2 is a diagram for describing an overall configuration of the information processing system according to the present embodiment.

As illustrated in FIG. 2, the information processing system according to the present embodiment includes the pet robots 1A and 1B, the cottage devices 3A and 3B, and a server 4. The server 4 can establish a connection with the pet robots 1A and 1B and the cottage devices 3A and 3B via a network 5 and perform transmission and reception of data.

The server 4 recognizes states of the pet robots 1A and 1B, specifically, whether the pet robot 1 is inside or outside the cottage device 3 (accommodating unit) (whether or not the pet robot 1 is accommodated in the cottage) and controls operations of the pet robots 1A and 1B. Further, the server 4 accumulates know ledge information acquired by the plurality of pet robots 1 at the respective spots (faces, predetermined actions, and the like of the family members) so that the plurality of pet robots 1 share the same know ledge information. The cottage device 3 serves as a place in which the pet robot 1 hides itself and has a function of charging the pet robot 1. For example, when the pet robot 1 comes from the cottage device 3 and acts charming to the family member (shaking its tail, walking up to the family member, or the like), if the battery level is low, the pet robot 1 can enter the cottage device 3 and start charging.

Figure 3:
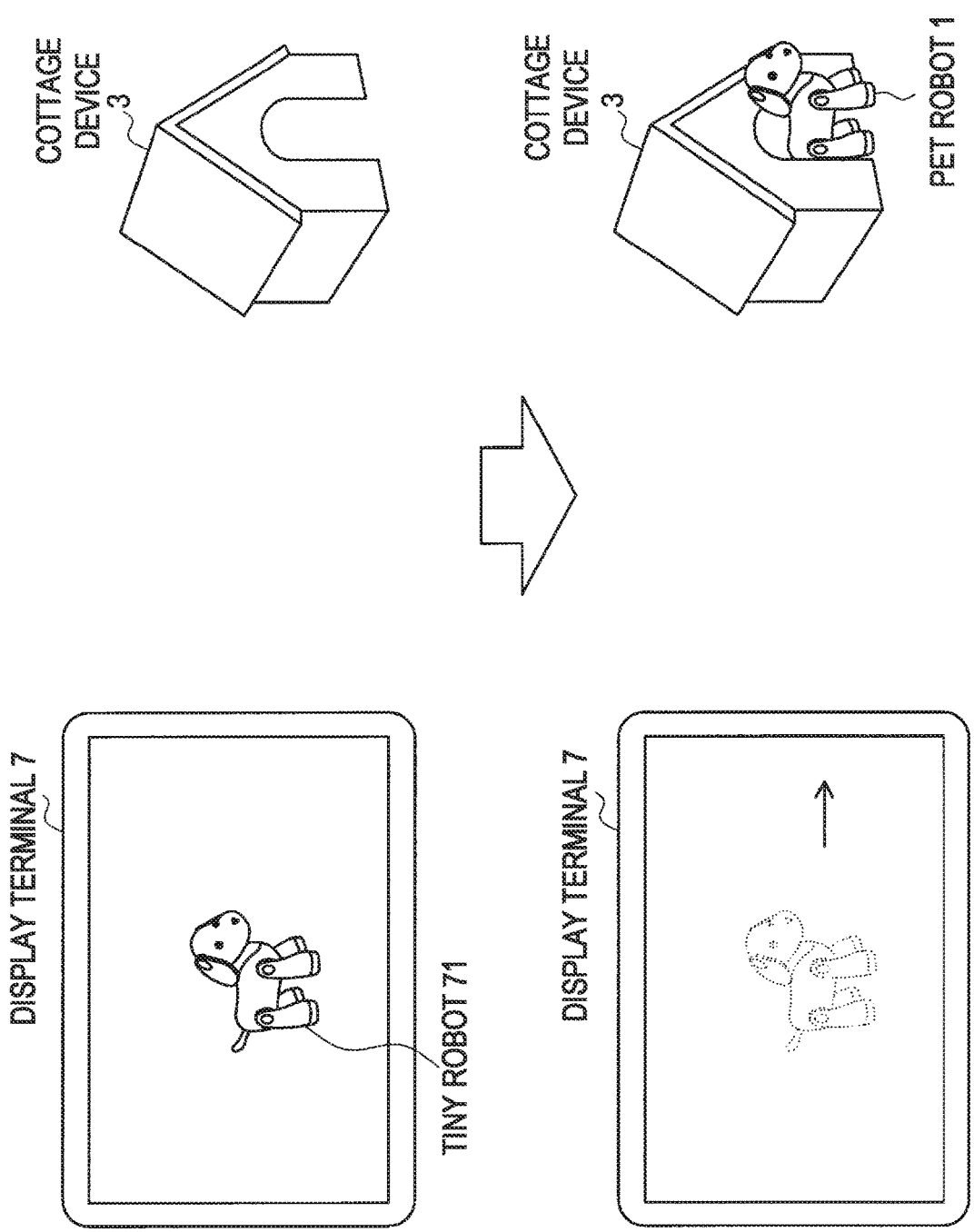
FIG. 3 is a diagram showing an example of virtualization of a pet robot according to the present embodiment.

Further, in the present embodiment, the pet robot 1 is used as an example of a "virtual creature," but the present embodiment is not limited thereto, and a virtual entity displayed on a display terminal 7 of a tablet terminal, a smartphone, or the like as illustrated in FIG. 3, that is, a tiny robot 71 of a software program, may be used. Among respective virtual creatures at a plurality of spots, at least one virtual creature may be a robot, and the other virtual creatures may be tiny robots of a software program. More specifically, for example, in a case in which one of the family members calls the pet robot from the display terminal 7, the real robot (the pet robot 1) outside the cottage device 3 autonomously enters the cottage device 3 and starts charging, and the tiny robot 71 which is the virtual entity appears on a screen table of the display terminal 7. Thereafter, if another family member calls the pet robot 1 toward the cottage device 3, control is performed such that the tiny robot 71 displayed on the display terminal 7 disappears from the screen, and the pet robot 1 which is the real robot comes out of the cottage device 3, and the tiny robot 71 and the pet robot 1 appear at the same time. The control of causing the tiny robot 71 to disappear from the screen is assumed to be performed using, for example, an animation in which the tiny robot 71 enters the cottage displayed on the screen, an animation in which the tiny robot 71 moves to the edge of the screen and frames out from the screen, and the like. As described above, even in a case in which there are a plurality of robots having different forms such as the real robot and the tiny robot, it is possible to cause a plurality of users to recognize them as one pet by performing control such that the plurality of robots are not visually recognized by the plurality of users simultaneously.

The overview of the information processing system according to the present embodiment has been described above. Next, configurations of the respective devices included in the information processing system according to the present embodiment will be specifically described with reference to the appended drawings.

2. Configuration

2-1. Configuration of Pet Robot

Figure 4:
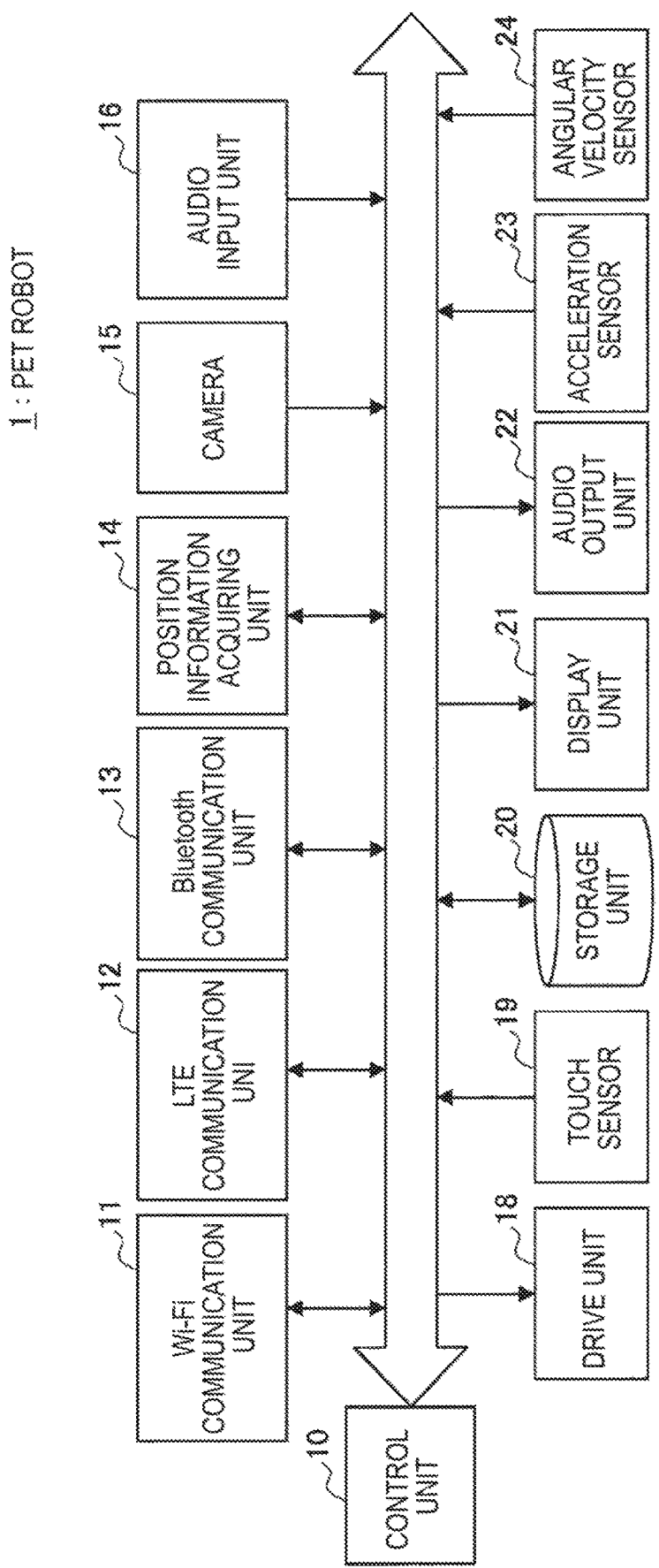
FIG. 4 is a block diagram illustrating an example of a configuration of a pet robot according to the present embodiment.

FIG. 4 is a block diagram illustrating an example of a configuration of the pet robot 1 according to the present embodiment. As illustrated in FIG. 4, the pet robot 1 includes a control unit 10, a Wi-Fi (registered trademark) communication unit 11, an LTE communication unit 12, a Bluetooth (registered trademark) communication unit 13, a position information acquiring unit 14, a camera 15, an audio input unit 16, a drive unit 18, a touch sensor 19, a storage unit 20, a display unit 21, an audio output unit 22, an acceleration sensor 23, and an angular velocity sensor 24.

Control Unit 10

The control unit 10 functions as an operation processing device and a control device, and controls an overall operation of the pet robot 1 in accordance with various kinds of programs. The control unit 10 is realized by an electronic circuit such as, for example, a central processing unit (CPU), a microprocessor, or the like. Further, the control unit 10 may include a read only memory (ROM) that stores a program, operation parameters, and the like to be used and a random access memory (RAM) that temporarily stores parameters that appropriately change and the like.

Further, the control unit 10 according to the present embodiment can perform autonomous control of operating automatically in accordance with various kinds of information obtained from the Wi-Fi communication unit 11, the LTE communication unit 12, the Bluetooth communication unit 13, the position information acquiring unit 14, the camera 15, the audio input unit 16, the touch sensor 19, the acceleration sensor 23, the angular velocity sensor 24, or the like.

The Wi-Fi communication unit 11 is a data transmission/reception unit using a communication scheme according to an IEEE 802.11 standard. The Wi-Fi communication unit 11 can establish a wireless connection with the network 5 and perform indoor positioning. Specifically, the Wi-Fi communication unit 11 scans radio waves transmitted from a surrounding Wi-Fi access point and acquires a beacon signal (including an SSID, a MAC address, and radio wave strength). Then, the Wi-Fi communication unit 11 acquires a position of the Wi-Fi access point (from the network) on the basis of the beacon signal, calculates a distance from the Wi-Fi access point on the basis of the radio wave strength, and measures a current position of the pet robot 1.

The LTE communication unit 12 is a data transceiving unit using a Long Term Evolution (LTE) scheme which is a new communication scheme following a third generation mobile communication scheme. The LTE communication unit 12 can establish a wireless connection with the network 5 and perform transmission and reception of data with the server 4.

The Bluetooth communication unit 13 is a data transceiving unit using a communication scheme according to an IEEE 802.15.1 standard which is near field communication. The Bluetooth communication unit 13 can specify an inquiry procedure as a device discovery procedure and discover other devices through beacons transmitted from peripheral devices. For example, the Bluetooth communication unit 13 receives a beacon broadcast from the cottage device 3 and estimates a positional relation with the cottage device 3 on the basis of a unique identifier included in the beacon or the radio wave strength.

The position information acquiring unit 14 has a function of detecting the current position of the pet robot 1 on the basis of a signal acquired from the outside. Specifically, for example, the position information acquiring unit 14 is realized by a Global Positioning System (GPS) unit, and receives radio waves from GPS satellites, detects a position at which the pet robot 1 is located, and outputs the detected position information to the control unit 10. The position information is transmitted to the server 4 and accumulated as a position log of the pet robot 1. Further, the position information acquiring unit 14 may detect the position through, for example, Wi-Fi, Bluetooth, transmission and reception with mobile phones, PHSs, smartphones, or the like, near field communication, or the like in addition to the GPS The camera 15 includes a lens system including an imaging lens, a diaphragm, a zoom lens, a focus lens, and the like, a drive system that performs a focusing operation or a zooming operation on the lens system, and a solid state imaging element array that photoelectrically converts imaging light obtained by the lens system and generates an imaging signal, and the like. The solid-state imaging element array may be realized by, for example, a charge coupled device (CCD) sensor array or a complementary metal oxide semiconductor (CMOS) sensor array.

The audio input unit 16 collects a voice of the user or ambient environmental sounds and outputs an audio signal to the control unit 10. The audio input unit 16 is realized by a microphone, a microphone amplifying unit that amplifies the audio signal obtained by the microphone, and an A/D converter that converts the audio signal into a digital audio signal, and outputs the audio signal to the control unit 10.

The drive unit 18 is a functional module for realizing a degree of freedom in each joint of the pet robot 1, and includes a plurality of driving units installed for each axis such as a roll, a pitch, a yaw and the like in each joint. Each driving unit is constituted by a combination of a motor that performs a rotational motion on a predetermined axis, an encoder that detects a rotational position of the motor, and a driver that adaptively controls the rotational position or the rotational speed of the motor on the basis of an output of the encoder.

The touch sensor 19 detects pressure received by physical pressure such as "petting" or "patting" from the user. Further, the pet robot 1 may have a pressure sensor instead of or in addition to the touch sensor 19.

The storage unit 20 stores a program or the like used when the control unit 10 executes various kinds of processes. Further, the storage unit 20 is constituted by a storage device including a storage medium, a recording device that records data in the storage medium, a reading device that reads data from the storage medium, a deleting device that deletes data recorded in the storage medium, and the like.

The display unit 21 is a display device such as electronic paper installed to cover the surface of the pet robot 1. The display unit 21 can display a coat state, clothes, or the like of the pet robot 1.

The audio output unit 22 is realized by a speaker and an amplifier circuit for the speaker. Further, the audio output unit 22 outputs a sound such as a barking sound.

The acceleration sensor 23 and the angular velocity sensor 24 detect a direction of the pet robot 1 or acceleration of a motion thereof.

The configuration of the pet robot 1 according to the present embodiment has been specifically described above. Further, the configuration of the pet robot 1 according to the present embodiment is not limited thereto, and for example, the Wi-Fi communication unit 11, the LTE communication unit 12, and the Bluetooth communication unit 13 may use other communication schemes.

Further, the pet robot 1 may use the camera 15 as a distance sensor for measuring a distance to an object is located ahead or may separately include a sensor using an infrared system, an ultrasonic system, or the like.

Further, for example, as illustrated in FIG. 2, the pet robot 1 may include a body unit 200, leg units 201 connected to front, back, left, and right parts of the body unit 200, a head unit 202 connected to a front end portion of the body unit 200, and a tail unit 203 connected to a rear end portion of the body unit 200. Further, the control unit 10 formed by connecting a CPU, a dynamic random access memory (DRAM), a flash read only memory (ROM), a personal computer (PC) card interface circuit, and a signal processing circuit to one another via an internal bus and a battery serving as a power source of the pet robot 1 are stored in the body unit 200. Further, the Wi-Fi communication unit 11, the LTE communication unit 12, the Bluetooth communication unit 13, the position information acquiring unit 14, the storage unit 20, the acceleration sensor 23, the angular velocity sensor 24, and the like are stored in the body unit 200.

Further, the camera 15 for imaging an external situation, the touch sensor 19 for detecting pressure received by a physical gesture such as "petting" or "patting" from the user, the audio input unit 16 for collecting external sounds, the audio output unit 22 for outputting a sound such as a barking sound, a distance sensor (not illustrated) for measuring the distance to the object located ahead, and the like are arranged in the head unit 202 at predetermined positions. The camera 15 may be installed at a position corresponding to an "eye" of the pet robot 1. Further, the camera 15 may be arranged at a forehead portion of the head unit 202, and a light emitting diode (LED) (not illustrated) may be arranged at the position corresponding to the "eye."

Further, actuators and potentiometers which correspond in number to a degree of freedom are arranged in each joint portion of each leg unit 201, each connected portion between each leg unit 201 and the body unit 200, a connection portion of the head unit 202 and the body unit 200, a connection portion of the tail of the tail unit 203, and the like. For example, the actuator includes a servo motor as a component. As the servomotor is driven, the leg unit 201 is controlled to transition to a desired attitude or motion.

A specific configuration example of the pet robot 1 described above is disclosed in, for example, JP 2002-157596A. The entire content of JP 2002-157596A is hereby incorporated by reference.

Further, the configuration of the pet robot 1 described above can also be applied to a case in which the pet robot 1 is the liny robot 71. Specifically, the display terminal 7 that displays the tiny robot 71 has a configuration corresponding to the control unit 10, the Wi-Fi communication unit 11, the LTE communication unit 12, the Bluetooth communication unit 13, the position information acquiring unit 14, the camera 15, the audio input unit 16, the touch sensor 19, the storage unit 20, the display unit 21, and the audio output unit 22. The tiny robot 71 is displayed on the display unit 21 and can interact with the user.

2-2. Configuration of Cottage Device

Figure 5:
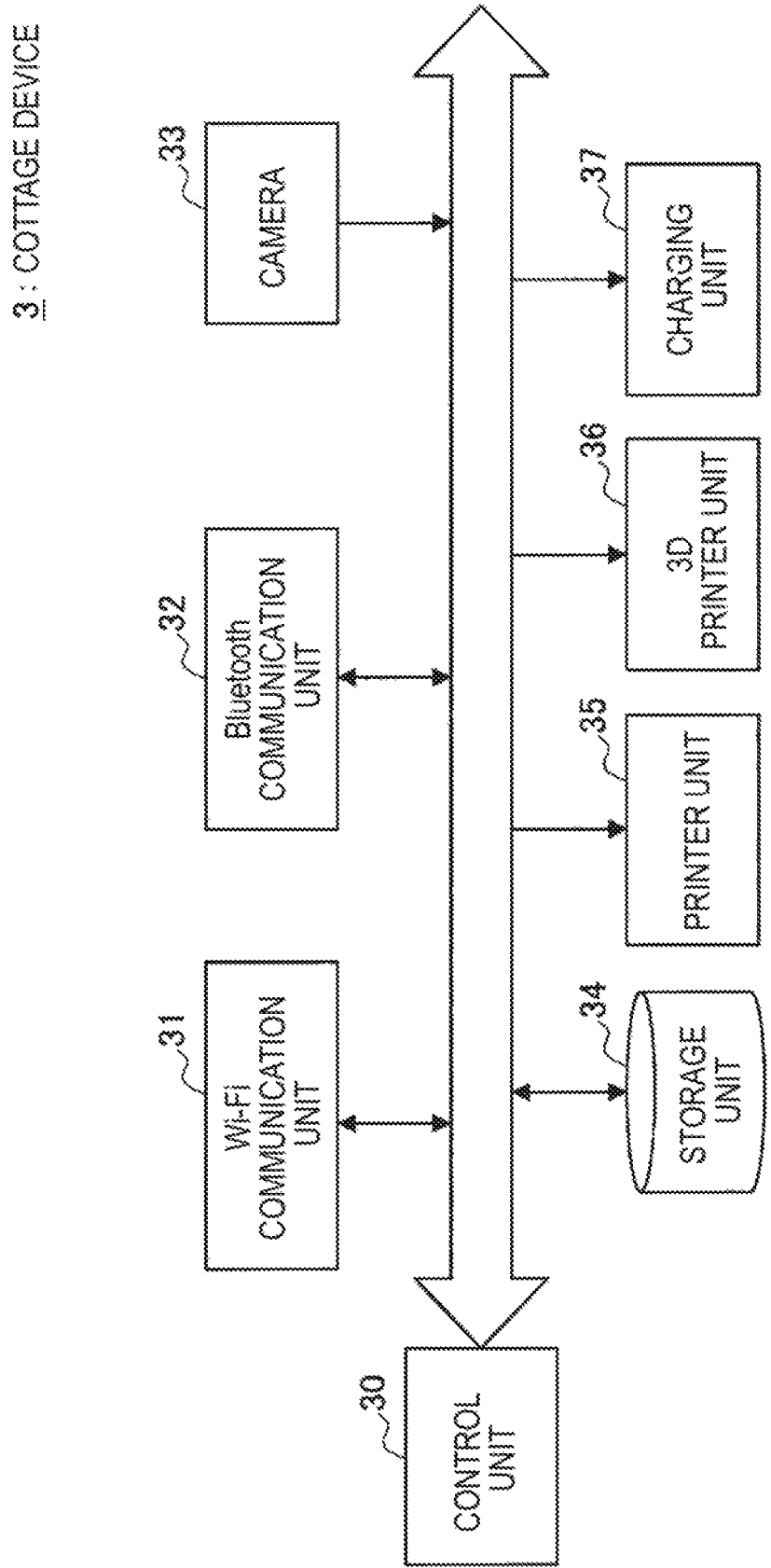
FIG. 5 is a block diagram illustrating an example of a configuration of a cottage device according to the present embodiment.

Next, a composition of the cottage device 3 according to the present embodiment will be described. FIG. 5 is a block diagram illustrating an example of a configuration of the cottage device 3 according to the present embodiment.

As illustrated in FIG. 5, the cottage device 3 according to the present embodiment includes a control unit 30, a Wi-Fi communication unit 31, a Bluetooth communication unit 32, a camera 33, a storage unit 34, a printer unit 35, a 3D printer unit 36, and a charging unit 37.

The control unit 30 functions as an operation processing device and a control device, and controls an overall operation of the cottage device 3 in accordance with various kinds of programs. The control unit 30 is realized by an electronic circuit such as, for example, a central processing unit (CPU), a microprocessor, or the like. Further, the control unit 30 may include a read only memory (ROM) that stores a program, operation parameters, and the like to be used and a random access memory (RAM) that temporarily stores parameters that appropriately change and the like.

Further, the control unit 30 according to the present embodiment also performs control such that the captured image obtained from the camera 33 is transmitted from the Wi-Fi communication unit 31 to the server 4. Further, the control unit 30 performs control such that the captured image received from the server 4 is printed from the printer unit 35 or the 3D printer unit 36.

The Wi-Fi communication unit 31 is a data transceiving unit using the communication scheme in accordance with the IEEE 802.11 standard. The Wi-Fi communication unit 31 establishes a wireless connection with the network 5, and performs transmission and reception of data with the server 4. Further, the Wi-Fi communication unit 31 can acquire the position of the cottage device 3 by indoor positioning.

The Bluetooth communication unit 32 is a data transceiving unit using a communication scheme according to an IEEE 802.15.1 standard which is near field communication. The Bluetooth communication unit 32 can broadcast the beacon to nearby devices and inform the nearby devices of the position of the cottage device 3. Further, the Bluetooth communication unit 32 can communicate with the pet robot 1 and acquire information of the position or the situation of the pet robot 1.

The camera 33 includes a lens system including an imaging lens, a diaphragm, a zoom lens, a focus lens, and the like, a drive system that performs a focusing operation or a zooming operation on the lens system, and a solid state imaging element array that photoelectrically converts imaging light obtained by the lens system and generates an imaging signal, and the like. The solid-state imaging element array may be realized by, for example, a charge coupled device (CCD) sensor array or a complementary metal oxide semiconductor (CMOS) sensor array. The camera 33 is installed inside the cottage device 3 and images an object put in the mouth of the pet robot 1.

The storage unit 34 stores a program or the like used when the control unit 30 executes various kinds of processes. Further, the storage unit 34 is constituted by a storage device including a storage medium, a recording device that records data in the storage medium, a reading device that reads data from the storage medium, a deleting device that deletes data recorded in the storage medium, and the like. Further, the storage unit 34 according to the present embodiment stores the information of the position or the situation of the pet robot 1.

The printer unit 35 includes a mechanism for printing on the basis of image data.

The 3D printer unit 36 includes a mechanism for generating an object on the basis of three-dimensional data.

The charging unit 37 includes a mechanism for charging the pet robot 1.

The configuration of the cottage device 3 according to the present embodiment has been specifically described above. The camera 33, the printer unit 35, the 3D printer unit 36, and the charging unit 37 are arranged inside the cottage device 3.

2-3. Configuration of Server

Figure 6:
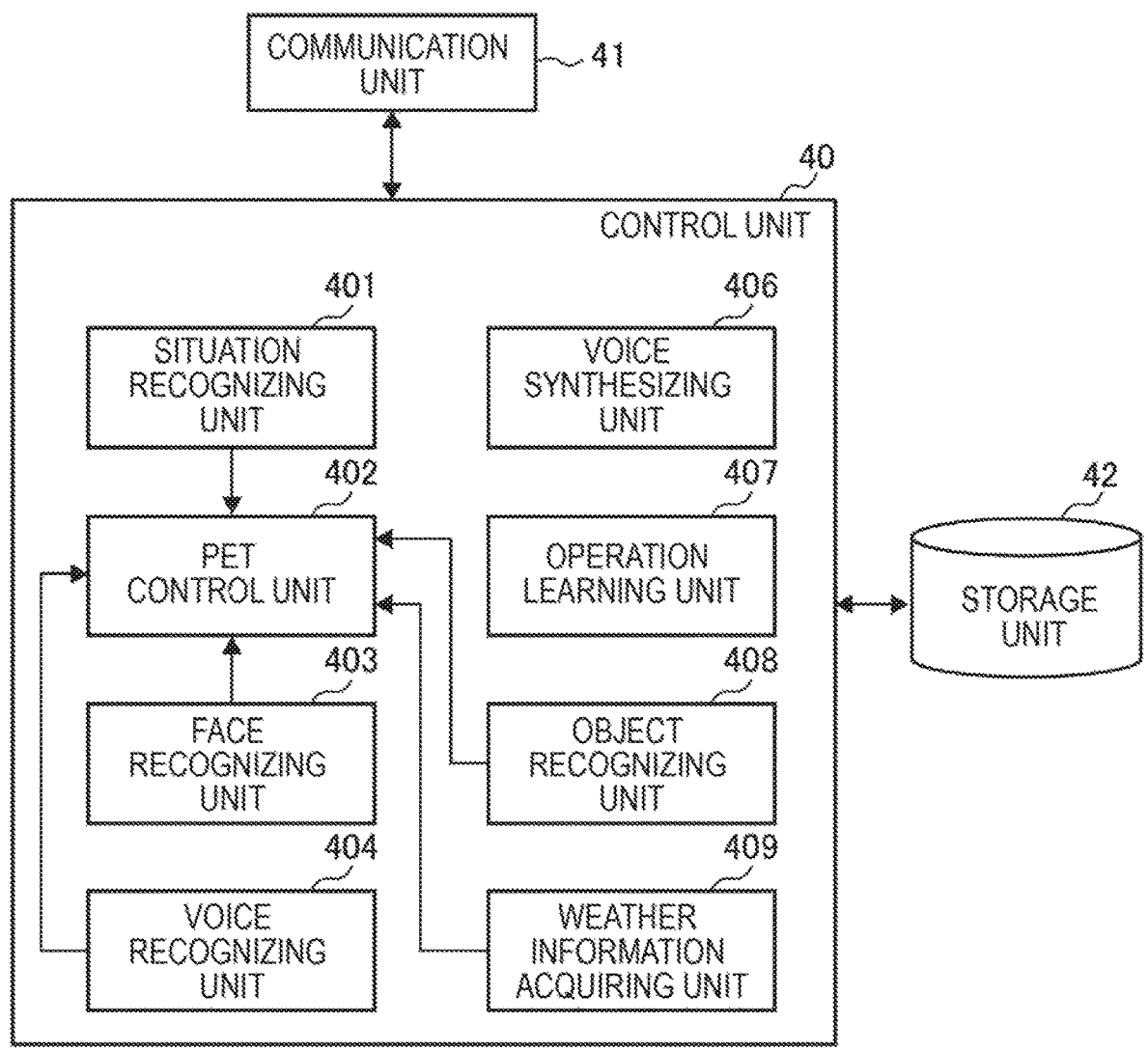
FIG. 6 is a block diagram illustrating an example of a configuration of a server according to the present embodiment.

Next, a configuration of server 4 according to the present embodiment will be described with reference to FIG. 6. FIG. 6 is a block diagram illustrating an example of a configuration of the server 4 according to the present embodiment.

As illustrated in FIG. 6, the server 4 according to the present embodiment has a control unit 40, a communication unit 41, and a storage unit 42.

The control unit 40 functions as an operation processing device and a control device, and controls an overall operation of the server 4 in accordance with various kinds of programs. The control unit 10 is realized by an electronic circuit such as, for example, a central processing unit (CPU), a microprocessor, or the like. Further, the control unit 10 may include a read only memory (ROM) that stores a program, operation parameters, and the like to be used and a random access memory (RAM) that temporarily stores parameters that appropriately change and the like.

Further, the control unit 40 according to the present embodiment functions as a situation recognizing unit 401, a pet control unit 402, a face recognizing unit 403, a voice recognizing unit 404, a voice synthesizing unit 406, an operation learning unit 407, an object recognizing unit 408, and a weather information acquiring unit 409.

The situation recognizing unit 401 recognizes a situation of each pet robot 1 on the basis of information transmitted from each pet robot 1 and each cottage device 3.

The pet control unit 402 controls the operation of each pet robot 1 by sending a control signal to each pet robot 1. Specifically, the pet control unit 402 generates a signal for controlling the operation of at least one pet robot 1 among a plurality of pet robots 1 such that a plurality of pet robots 1 are not visually recognized at the same time by a specific user and transmits the generated signal to the one pet robot 1.

The face recognizing unit 403 analyzes the captured image captured by the pet robot 1 and recognizes a face image. Further, the face recognizing unit 403 can also compare it with a user face image stored in the storage unit 42 and identify a person shown in the captured image.

The voice recognizing unit 404 analyzes an audio signal collected by the pet robot 1, converts speech of the user into text, and performs morphological analysis, semantic analysis, and the like on the speech text.

The voice synthesizing unit 406 generates an audio signal to be output from the pet robot 1.

The operation learning unit 407 learns the operation of the pet robot 1 and stores a learning result in the storage unit 42. For example, when the pet robot 1 is caused to randomly perform a predetermined operation in response to the speech of the user, if positive feedback is obtained from the user, the operation learning unit 407 interprets that the operation is correct and registers speech content and the operation in the storage unit 42 in association with each other.

The object recognizing unit 408 analyzes the captured image and recognizes the object shown in the captured image. For example, the object recognizing unit 408 can analyze the captured image captured by the cottage device 3 and recognize an object put in the mouth of the pet robot 1.

The weather information acquiring unit 409 acquires weather information from another server (not illustrated) on the network. For example, the acquired weather information is used to display the coat of the pet robot 1 as if it were wet in the display unit 21 installed on the surface of the pet robot 1 in a case in which the weather between the A spot and the B spot is rainy.

The communication unit 41 is a communication module for performing transmission and reception of data with other devices in a wired/wireless manner. For example, the communication unit 41 performs transmission and reception of data with the pet robot 1 and the cottage device 3 at each spot via the network 5. More specifically, the communication unit 41 receives the current state of the pet robot 1 (position information, whether the pet robot 1 is inside or outside the cottage, whether or not the pet robot 1 is operating in a free mode, or the like) and transmits a signal (also referred to as a command in this specification) for controlling the pet robot 1.

The storage unit 42 stores a program or the like used when the control unit 40 executes various kinds of processes. Further, the storage unit 42 is constituted by a storage device including a storage medium, a recording device that records data in the storage medium, a reading device that reads data from the storage medium, a deleting device that deletes data recorded in the storage medium, and the like.

3. Operation Process

Next, an operation process of the information processing system according to the present embodiment will be described with reference to FIGS. 7 to 19.

3-1. Cooperative Operation Control at Remote Site

First, cooperative operation control in the free mode will be described as basic control with reference to FIG. 7. In the case in which no special occasion occurs for each pet robot 1, the server 4 performs free mode control in which the pet robot 1 moves between the remote sites at appropriate timings and walks outside the cottage.

Figure 7:
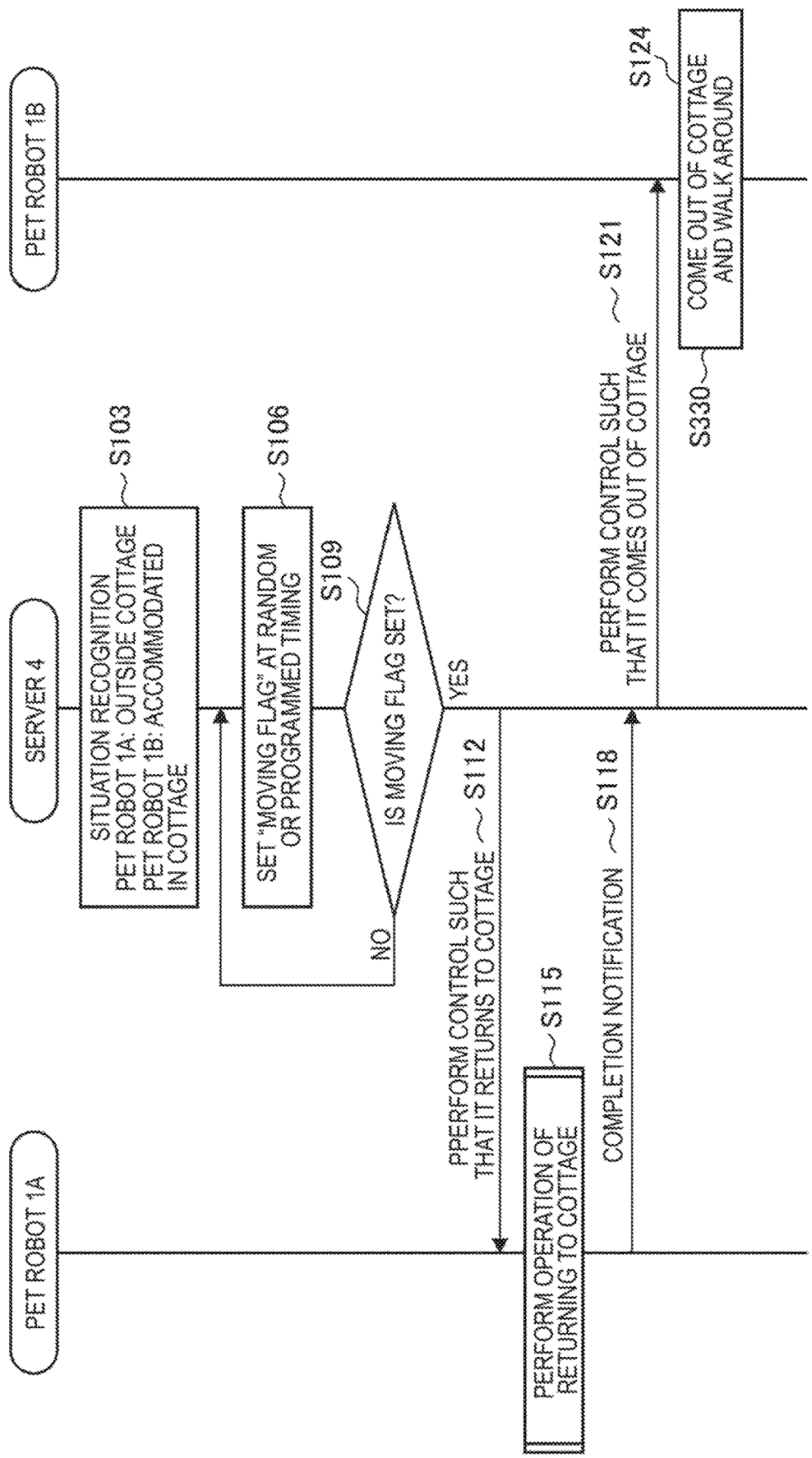
FIG. 7 is a sequence diagram illustrating a cooperative operation control process for a pet robot according to the present embodiment.

FIG. 7 is a sequence diagram illustrating the cooperative operation control process for the pet robot according to the present embodiment. As illustrated in FIG. 7, first, the server 4 recognizes the situation of the pet robot 1 at each spot using the situation recognizing unit 401 (step S103). Specifically, for example, the situation recognizing unit 401 acquires the position information and the driving states of the pet robots 1A and 1B, and the position information of the cottage devices 3A and 3B, and recognizes whether the pet robot 1 is inside or outside the cottage device 3 from the positional relation between the pet robot 1 and the cottage device 3. Alternatively, the situation recognizing unit 401 recognizes whether the pet robot 1 is inside or outside the cottage device 3 on the basis of a detection result of a sensor (or the camera 33) which is installed in the cottage device 3 and capable of detecting whether or not the pet robot 1 is accommodated in the cottage. Here, for example, a situation in which the pet robot 1A at the A spot is outside the cottage, and the pet robot 1B at the B spot is accommodated in the cottage (sleep state) is recognized.

Then, the server 4 sets a moving flag at a random or programmed timing through the pet control unit 402 (step S106).

Then, when the moving flag is set (YES in step S109), the pet control unit 402 controls the pet robot 1A such that the pet robot 1A returns to the cottage (step S112). Specifically, the pet control unit 402 transmits a command for instructing the operation of returning to the cottage from the communication unit 41 to the pet robot 1A.

Then, the pet robot 1A performs an operation of autonomously returning to the cottage in accordance with the command from the server 4 (step S115). The operation of returning to the cottage will be described later in detail with reference to FIG. 8.

Then, the pet robot 1A gives a notification indicating that the operation of returning to the cottage is completed (that is, it enters the sleep state) to the server 4 (step S118).

Then, if the server 4 receives the completion notice for the operation of returning to the cottage (the notification indicating that it enters the sleep state) from the pet robot 1A, the server 4 transmits a command for instructing an operation of coming out of the cottage to the pet robot 1B (step S121).

Then, the pet robot 1B autonomously comes out of the cottage device 3B in accordance with the command from the server 4 and performs, for example, an operation of walking around or walking to a person whose face is recognized.

As described above, in a case in which a plurality of pet robots 1 are located at remote sites, control is performed such that the pet robot 1 does not simultaneously appear from the cottage device 3 at a plurality of spots, and thus it is possible to implement an effect as if one pet robot moves between a plurality of spots. Further, such operation control is not limited to control for the real robot, but is similarly performed for the tiny robot 71 displayed on the display terminal 7 of the tablet terminal or the like.

3-2. Control of Operation of Returning to Cottage

Figure 8:
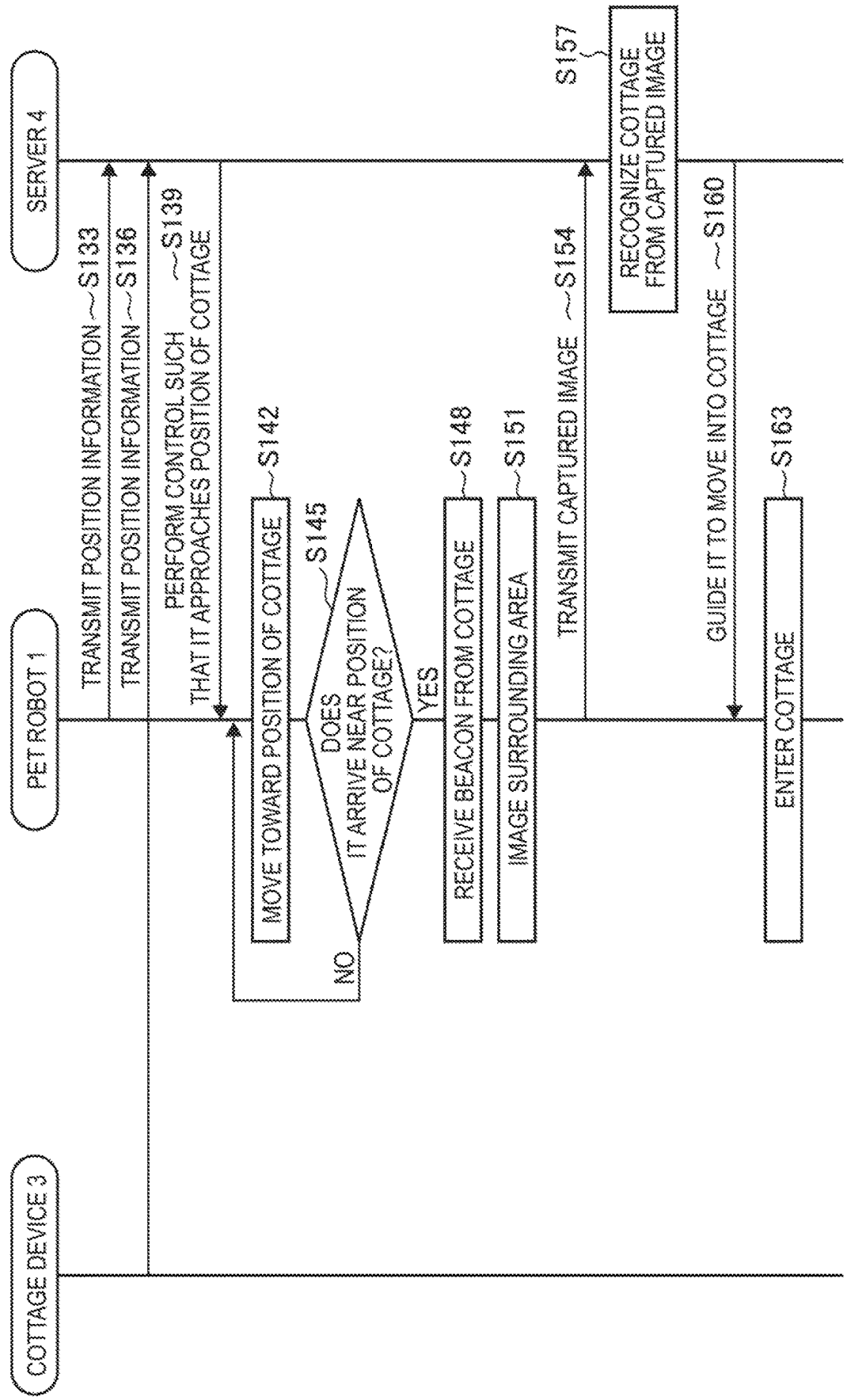
FIG. 8 is a sequence diagram illustrating an operation process of returning to a cottage according to the present embodiment.

Next, the control of the operation of returning to the cottage described in step S115 will be described with reference to FIG. 8. FIG. 8 is a sequence diagram illustrating the operation process of returning to the cottage according to the present embodiment.

As illustrated in FIG. 8, first, the pet robot 1 and the cottage device 3 transmit their own position information to the server 4 (step S133 and step S136). A transmission timing of the position information is not particularly limited, but the position information may be transmitted, for example, in a case in which there is a request from the server 4, in a case in which an instruction for the operation of returning to the cottage is given, or periodically. For example, the pet robot 1 acquires the current position through the position information acquiring unit 14 or the Wi-Fi communication unit 11, and transmits the current position to the server 4. Further, for example, the cottage device 3 acquires the current position through the Wi-Fi communication unit 31, and transmits the current position to the server 4.

Then, the server 4 controls the pet robot 1 such that the pet robot 1 approaches the cottage device 3 (step S139). Specifically, for example, the server 4 transmits a command for instructing approaching the corresponding position to the pet robot 1 together with the position information of the cottage device 3.

Then, the pet robot 1 moves toward the position of the cottage device 3 in accordance with the command from the server 4 (step S142). Specifically, the pet robot 1 controls the drive unit 18, and autonomously moves toward the position of the cottage device 3.

If the pet robot 1 arrives near the position of the cottage (YES in step S145), the pet robot 1 receives the beacon broadcast from Bluetooth communication unit 32 of the cottage device 3.

Then, upon receiving the beacon transmitted from the cottage device 3, the pet robot 1 images a surrounding area with the camera 15 (step S151) and transmits the captured image to the server 4 (step S154).

Then, the object recognizing unit 408 of the server 4 recognizes the cottage device 3 from the captured image (step S157). Accordingly, the server 4 can more accurately detect a direction and a distance in which the cottage device 3 is located relative to the pet robot 1.

Then, the pet control unit 402 of the server 4 performs control such that the pet robot 1 is guided to move in the direction of the cottage device 3 recognized from the captured image (step S160). Specifically, for example, the pet control unit 402 transmits a command for instructing the pet robot 1 to move to the cottage device 3 on the basis of the direction and the distance of the cottage device 3 from the communication unit 41 to the pet robot 1.

Then, the pet robot 1 moves closer to the cottage device 3 and enters the cottage device 3 in accordance with the command from the server 4.

The control process when the pet robot 1 autonomously returns to the cottage device 3 has been described above. Further, in the above example, control of guiding to the cottage device 3 is performed on the basis of a combination the position information, the Bluetooth beacon, and the captured images of the cottage device 3 and the pet robot 1, but the present embodiment is not limited thereto, and any other system may be employed to detect the positions of the pet robot 1 and the cottage device 3 and cause the pet robot 1 to autonomously walk into the cottage device 3.

3-3. User Registration

Figure 9:
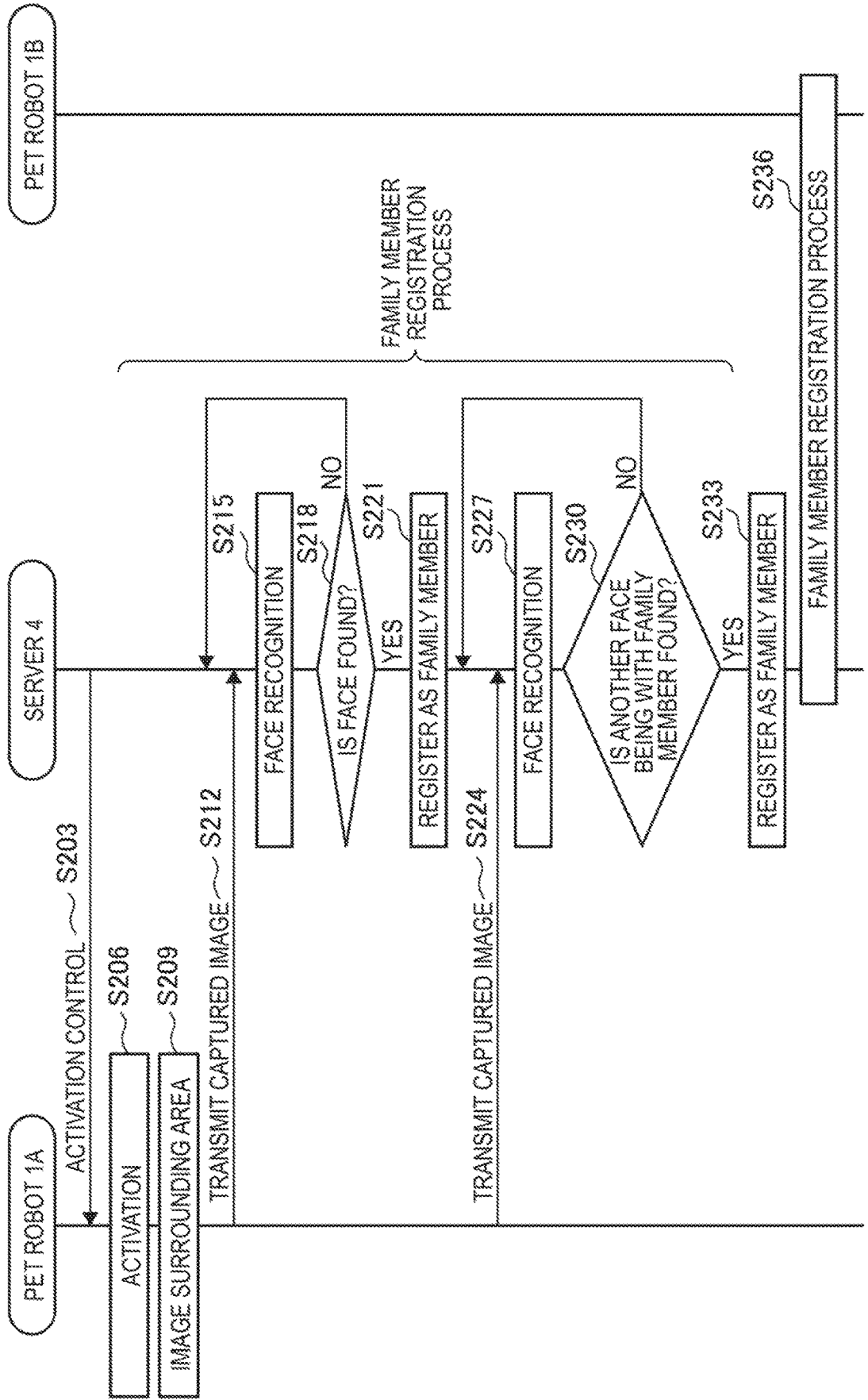
FIG. 9 is a sequence diagram illustrating a user registration process according to the present embodiment.

Next, user registration for the pet robot 1 will be described with reference to FIG. 9. FIG. 9 is a sequence diagram illustrating a user registration process according to the present embodiment.

As illustrated in FIG. 9, first, the server 4 performs activation control for the pet robot 1A (step S203), and the pet robot 1A is activated (step S206).

Then, the pet robot 1A images the surrounding area with the camera 15 (step S209), and transmits the captured image to the server 4 (step S212).

Then, the server 4 performs the face recognition on the captured image by the face recognizing unit 403 (step S215).

Then, if the face is recognized from the captured image (step S218), the control unit 40 of the server 4 registers the person as the family member (step S221). Specifically, the control unit 40 stores the recognized face image or the feature quantity of the face in the storage unit 42. As described above, for example, it is possible to recognize and register the person who is first recognized immediately after purchase as the family member.

Then, in a case in which the captured image is further transmitted from the pet robot 1A (step S224), the server 4 performs the face recognition through the face recognizing unit 403 (step S227).

Then, in a case in which the face of another person is recognized from the captured image together with the registered family member on the basis of the face recognition result (YES in step S230), the control unit 40 of the server 4 recognizes the recognized new person as the family member (step S233). As described above, it is possible to recognize and register a person who is with the family member as the family member.

The server 4 performs a process similar to the family member registration processing described in steps S203 to S233 described above for the pet robot 1B (step S236). Accordingly, it is possible to register the family member at the spot B. Even at the spot B, a person who is first recognized after activated is registered as the family member, and then a person who is with the family member is registered as the family member.

Further, the "family member" is a target whom the pet robot 1 has to act charming to or listen to an instruction from, and a friend who is with the family member may be recognized and registered as the family member.

Further, the server 4 can also register a voice feature quantity of the family member. For example, the server 4 receives the captured image captured by the pet robot 1 and the collected voice information when the family member speaks to the pet robot 1, analyzes the captured image and the voice information, and stores the captured image and the sound information in the storage unit 42 as the voice feature quantity in association with the family member together with the face image.

3-4. Operation Control According to Call from Family Member

Figure 10:
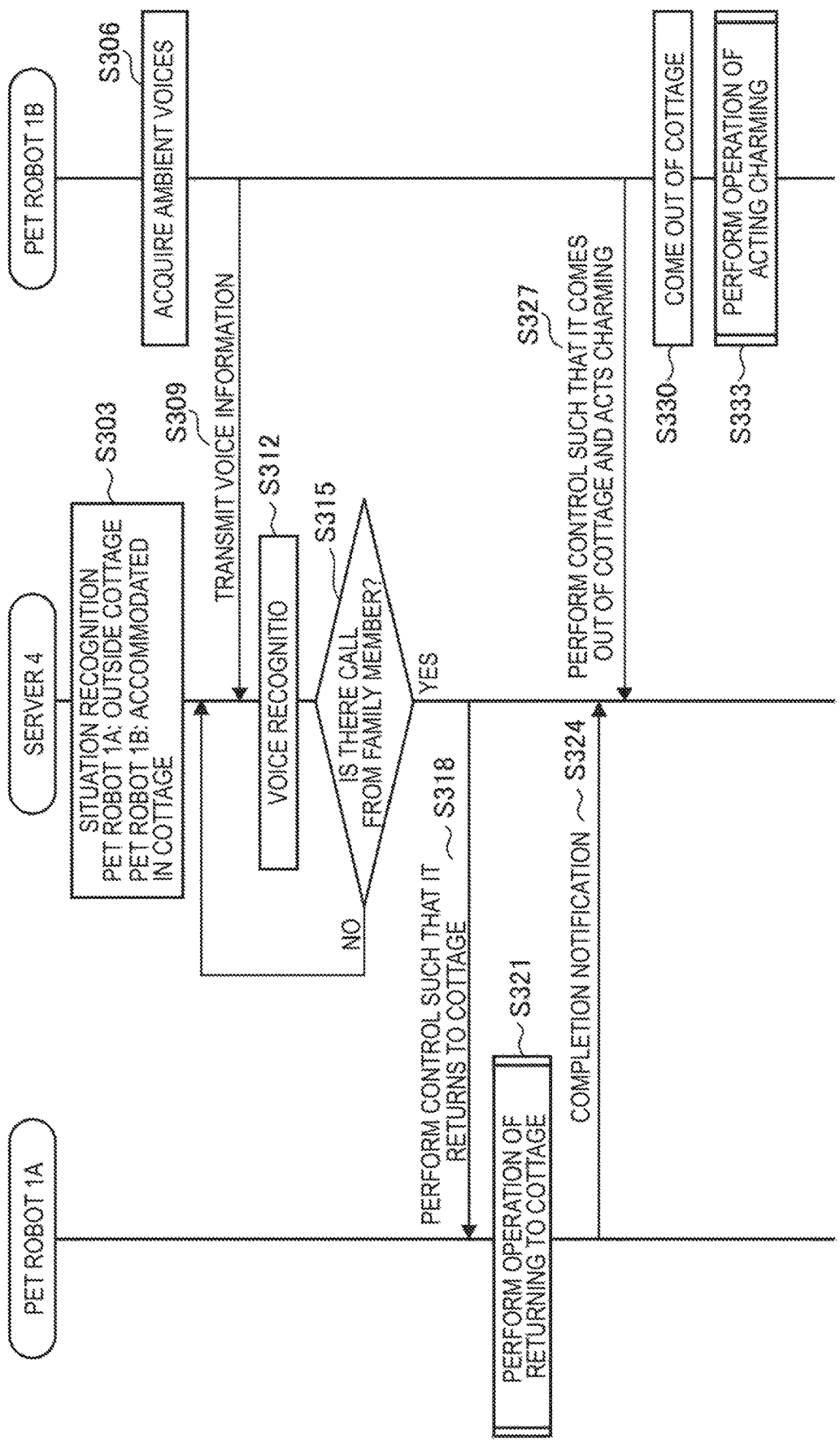
FIG. 10 is a sequence diagram illustrating a cooperative operation control process for a pet robot in a ease in which family member registration is performed according to the present embodiment.

Next, an example of the free mode control in a case in which the family member registration is performed will be described with reference to FIG. 10. FIG. 10 is a sequence diagram illustrating the cooperative operation control process for the pet robot 1 in a case in which the family member registration is performed according to the present embodiment.

As illustrated in FIG. 10, the server 4 first recognizes the situation of the pet robot 1 at each spot through the situation recognizing unit 401 (step S303). Here, for example, a situation in which the pet robot 1A at the A spot is outside the cottage, and the pet robot 1B at the B spot is accommodated in the cottage (sleep state) is recognized.

Then, the pet robot 1B continuously acquires ambient voices while staying in the cottage device 3B (step S306), and transmits the voice information to the server 4 (step S309).

Then, the server 4 recognizes the voice received from the pet robot 1 through the voice recognizing unit 404 (step S312).

Then, on the basis of the recognition result, the control unit 40 of the server 4 determines whether or not there is a call from the family member (step S315). Specifically, the control unit 40 recognizes whether or not the voice is a voice of the family member on the basis of the voice feature quantity of the family member (the voice quality or the like) registered in the storage unit 42, and further recognizes the call from the family member (calling of the name of the pet robot 1B or calling such as "come here!" or "come out!").

In a case in which it is determined that there is a call from the family member (YES in step S315), the pet control unit 402 of the server 4 performs control such that the pet robot 1A returns to the cottage (step S318).

Then, the pet robot 1 performs an operation of returning to the cottage (step S321), and gives a notification indicating that the operation of returning to the cottage is completed to the server 4 (step S324).

Then, if the completion notice for the operation of returning from the pet robot 1A to the cottage (the notification indicating that it enters the sleep state) is received, the server 4 transmits a command for instructing the pet robot 1B to come out of the cottage A and act charming (activation instruction) to the pet robot 1B (step S327).

Then, in accordance with the command from the server 4, the pet robot 1B comes out of the cottage device 3B (step S330) and performs an operation of acting charming to the family member (step S333). The operation of acting charming will be described below in detail with reference to FIG. 11.

As described above, in a case in which the family member at the remote site calls, the pet robot 1A outside the cottage enters the cottage, and control is performed such that the pet robot 1B at the spot in which the family member calls comes out of the cottage, and thus the effect as if one pet robot moves between a plurality of spots can be implemented.

3-5. Operation of Acting Charming

Figure 11:
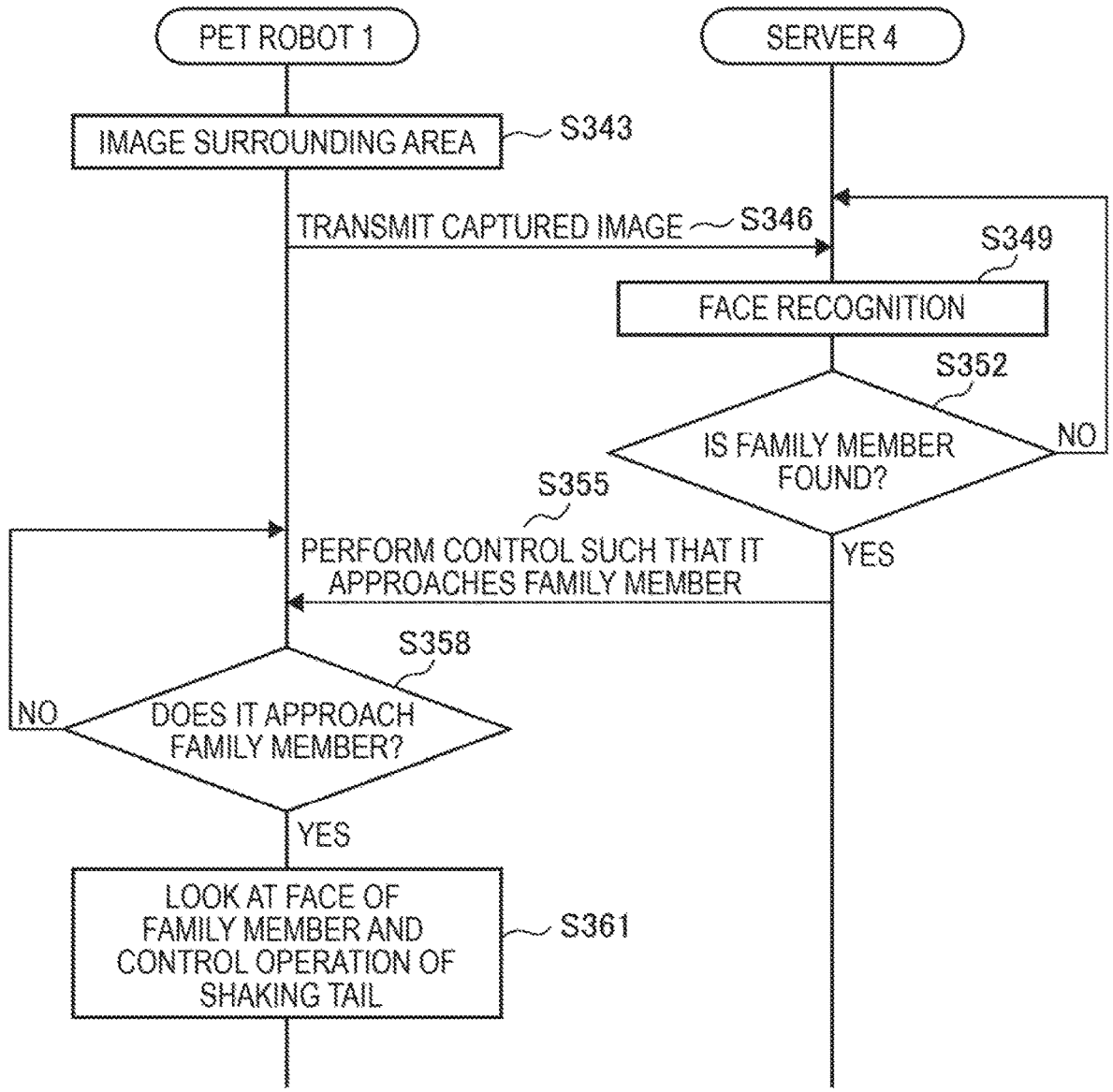
FIG. 11 is a sequence diagram illustrating operation control of acting charming according to the present embodiment.

FIG. 11 is a sequence diagram illustrating operation control of acting charming according to the present embodiment.

As illustrated in FIG. 11, the pet robot 1 first images the surround area with the camera 15 in a state in which it is outside the cottage (step S343) and transmits the captured image to the server 4 (step S346). The pet robot 1 continuously images the surrounding area while moving around, and transmits the captured image to the server 4.

Then, the server 4 performs the face recognition on the basis of the captured image transmitted from the pet robot 1 through the face recognizing unit 403 (step S349).

Then, the control unit 40 of the server 4 determines whether or not the family member is found on the basis of the face recognition result (step S352).

Then, in a case in which the family member is found (YES in step S352), the pet control unit 402 performs control such that the pet robot 1 approaches the family member (step S355). Specifically, the pet control unit 402 estimates a direction in which the family member is present on the basis of the recognition result of the captured image, and transmits a command for instructing to the pet robot 1 to move in the estimated direction.

Then, the pet robot 1 approaches the family member sufficiently in accordance with the command from the server 4 (step S358). Further, the pet robot 1 continually images the surrounding area with the camera 15 and transmits the captured image to the server 4. The server 4 recognizes the face of the family member from the captured image, continuously estimates the direction in which the family member is present, and transmits a movement command to the pet robot 1. Accordingly, the pet robot 1 can sufficiently approach the family member.

Then, in a case in which the pet robot 1 sufficiently approaches the family member (YES in step S358), the pet robot 1 looks at the face of the family member and performs, for example, an operation of shaking the tail (step S361). Here, the operation of shaking the tail has been described as an example, but the operation of acting charming is not limited thereto, and for example, an operation of squatting at the feet of the family member, an operation of sitting on the lap in a case in which the family member is sitting, or an operation of purring may be performed.

3-6. Discipline Controls

Figure 12:
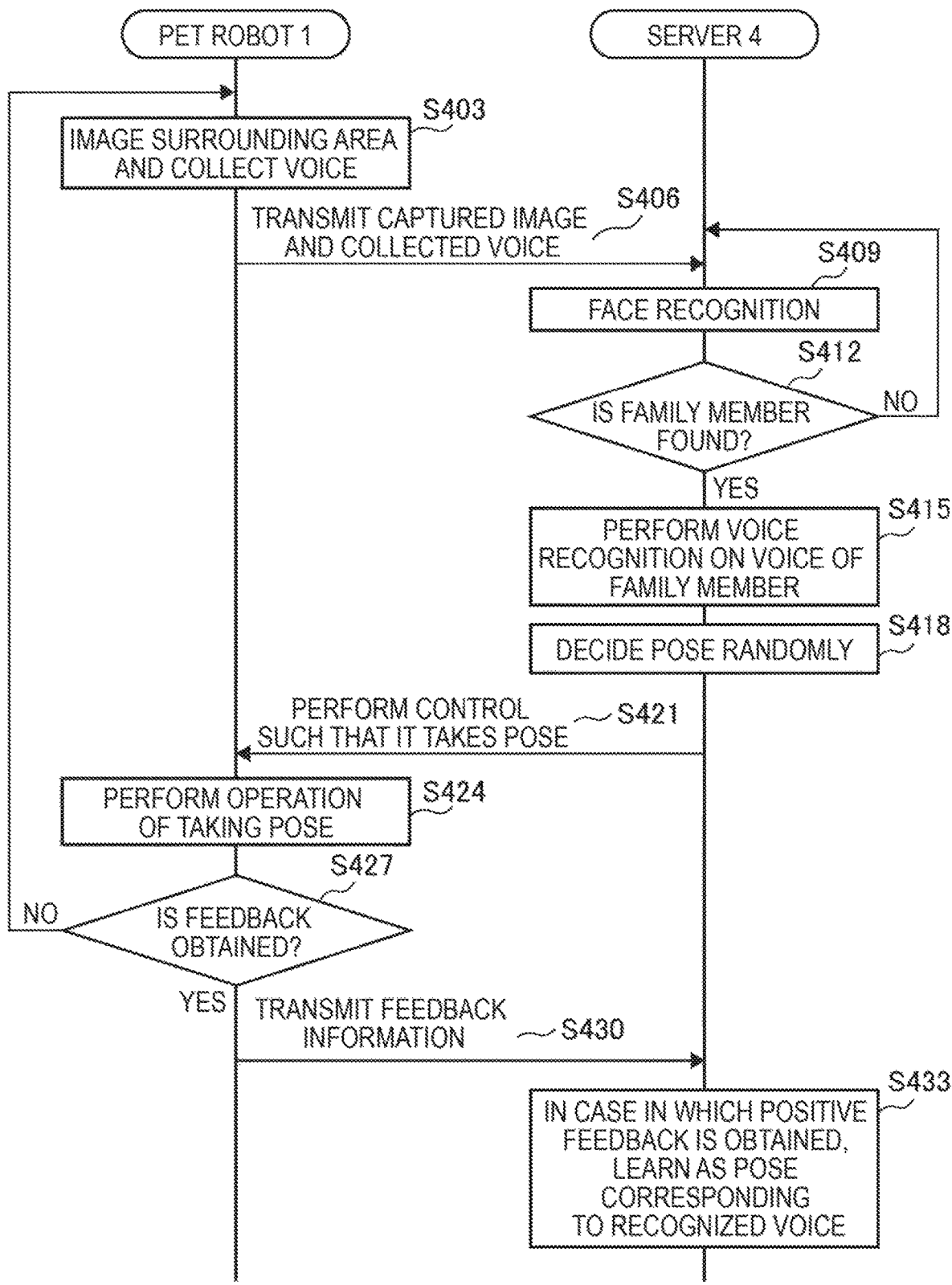
FIG. 12 is a sequence diagram illustrating a discipline control process according to the present embodiment.

Next, discipline control for memorizing actions such as "hand," "sit," "lie" and the like will be described with reference to FIG. 12. FIG. 12 is a sequence diagram illustrating a discipline control process according to the present embodiment.

As illustrated in FIG. 12, the pet robot 1 first images the surrounding area with the camera 15, collects an ambient voice with the audio input unit 16 (step S403), transmits the captured image and the collected voice to the server 4 (step S406).

Then, the server 4 performs the face recognition on the basis of the captured image transmitted front the pet robot 1 by the face recognizing unit 403 (step S409), and finds the face of the family member stored in the storage unit 42 (step S412).

Then, in a case in which the family member is found on the basis of face recognition result (YES in step S412), the server 4 performs voice recognition on the basis of the collected voice transmitted from the pet robot 1 through the voice recognizing unit 404, and recognizes the voice of the family member (step S415). For example, the server 4 recognizes the user commands ("hand," "sit," "lie," or the like) for the pet robot 1.

Then, the pet control unit 402 of the server 4 randomly determines a pose from a plurality of poses stored in the storage unit 42 (step S418), and transmits a command for instructing to the pet robot 1 to take the decided pose (step S421). For example, the poses stored in the storage unit 42 include various poses and actions (for example, "hand," "sit," "lie," and the like) which are memorized by training.

Then, the pet robot 1 operates to take a pose in accordance with the command from the server 4 (step S424).

Then, it is determined whether or not feedback is obtained from the family member (step S427). For example, in a case in which the pose taken by the pet robot 1 in accordance with the command is in line with an intention of the family member who gave the command, the family member is expected to pat the head or the torso of the pet robot 1 or say a compliment such as "great!" or "good!" The patting the head or the torso can be detected by the touch sensor 19 of the pet robot 1.

Then, in a case in which certain feedback is obtained (YES in step S427), the pet robot 1 transmits feedback information to the server 4 (step S430).

Then, in a case in which the feedback obtained by the pet robot 1 is a positive one such as patting the head or the compliment described above, the operation learning unit 407 of the server 4 stores the pose decided in step S418 in the storage unit 42 in association with the voice recognized in step S409 (step S433).

As described above, it is possible to train the pet robot 1 to perform predetermined actions in response to calling. Further, since the memorized actions are managed by the server 4, for example, the discipline performed on the pet robot 1A can also be reproduced by the pet robot 1B. More specifically, for example, the pet control unit 402 transmits a control signal for instructing an action corresponding to what the family member says to the pet robot 1B (the command for instructing to take an associated pose) to the pet robot 1B on the basis of the learning result for the pose stored in the storage unit 42. Accordingly, it is possible to implement the effect of sharing and raising one pet robot between the remote sites.

Further, in the information processing system according to the present embodiment, a gesture of the family member may be learned further together with calling. For example, the operation learning unit 407 of the server 4 recognizes the gesture of the user from the captured image and stores the gesture in association with it when learning the pose in step S433. Accordingly, it is possible to cause the pet robot 1 to perform a predetermined action when a certain gesture is taken.

3-7. Operation of Bringing Object to Remote Site

Figure 13:
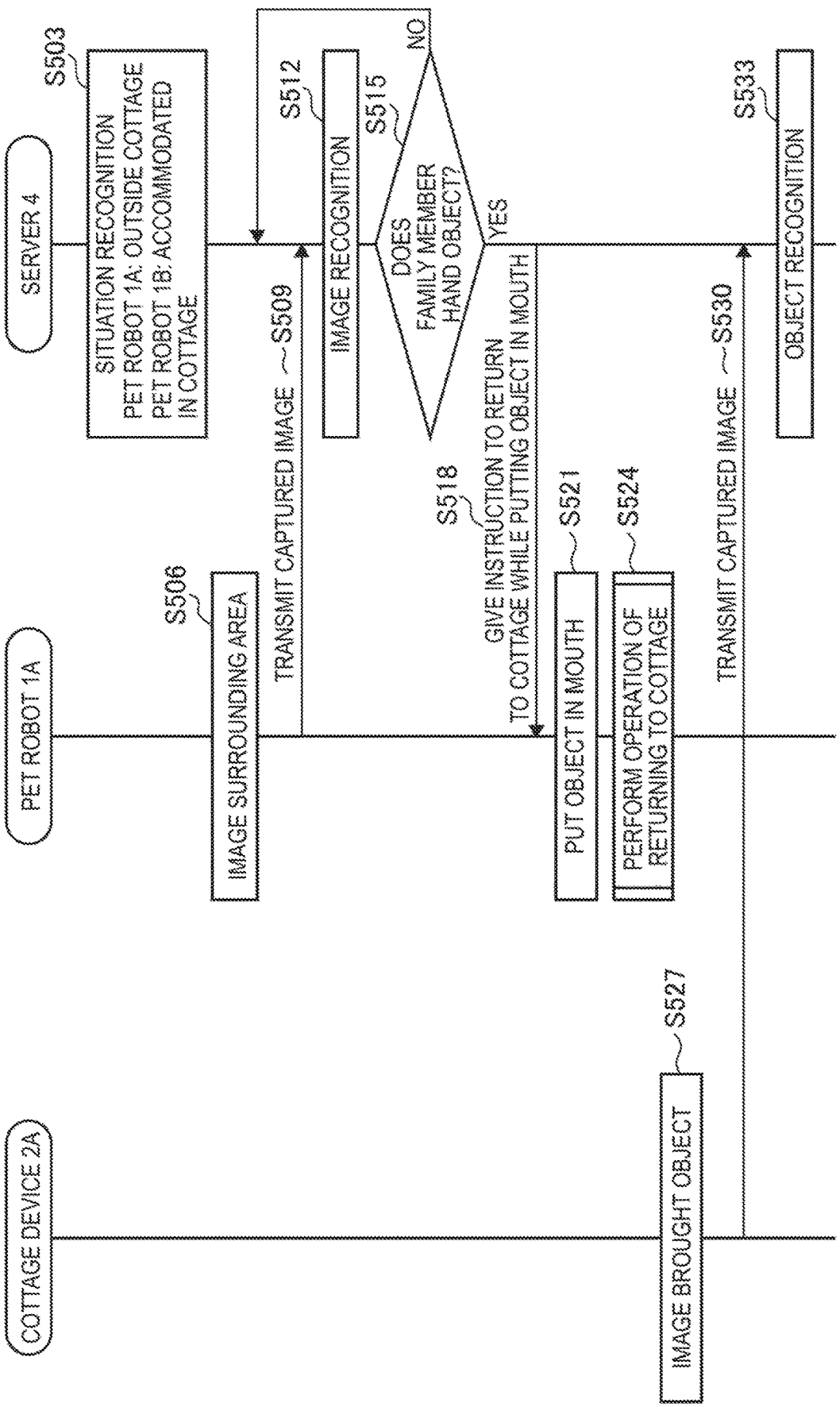
FIG. 13 is a sequence diagram illustrating an operation process when an object is handed over to a pet robot according to the present embodiment.
Figure 14:
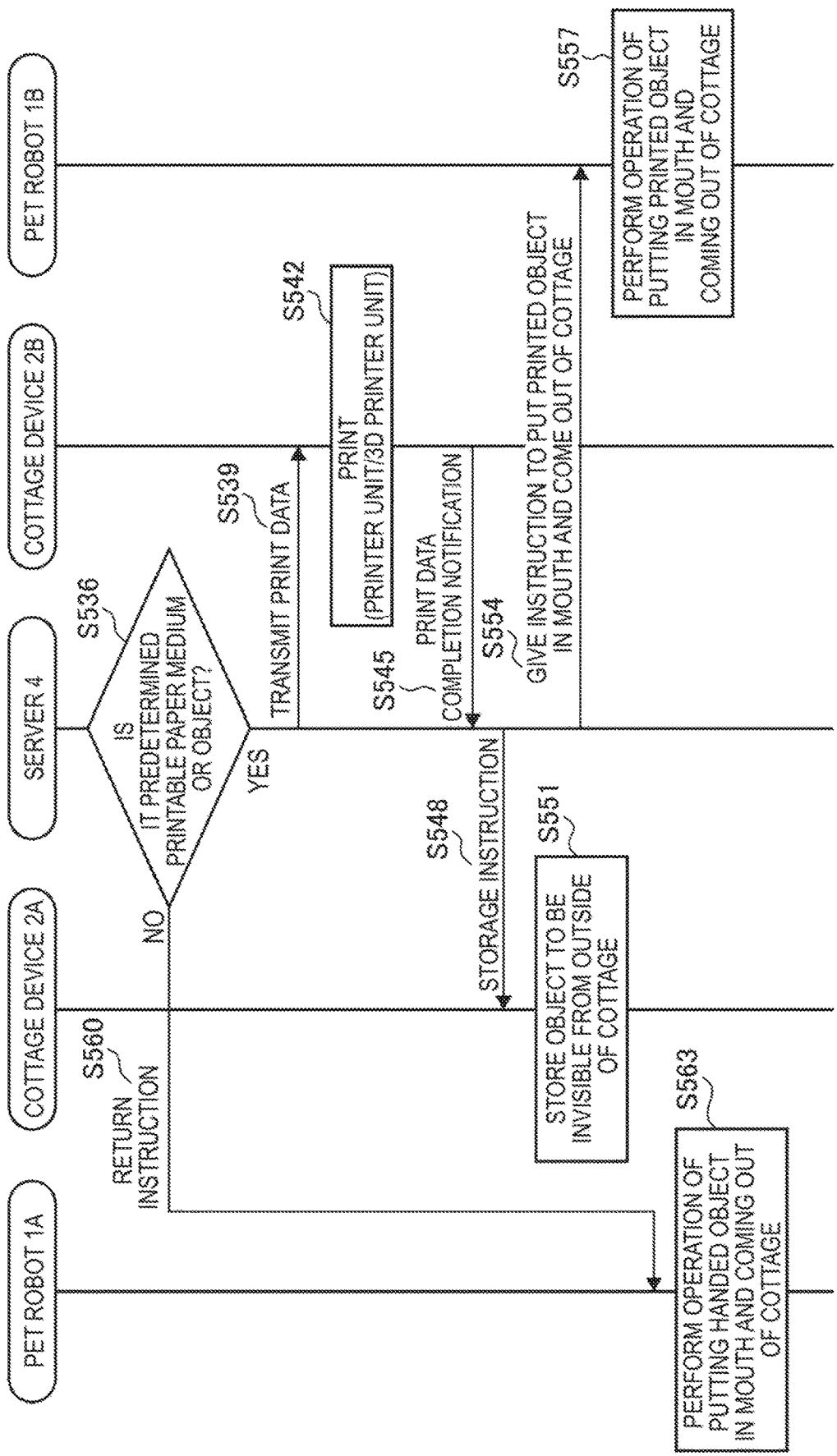
FIG. 14 is a sequence diagram illustrating an operation process when an object is handed over to a pet robot according to the present embodiment.

Then, control for implementing an effect in which the pet robot 1 conveys an object between the remote site w ill be described with reference to FIGS. 13 and 14. FIG. 13 and FIG. 14 are sequence diagrams illustrating an operation process in a case in which an object is passed to the pet robot 1 according to the present embodiment.

As illustrated in FIG. 13, the server 4 first recognizes the situation of the pet robot 1 at each spot through the situation recognizing unit 401 (step S503). Here, for example, a situation in which the pet robot 1A at the A spot is outside the cottage, and the pet robot 1B at the B spot is accommodated in the cottage is recognized.

Then, the pet robot 1A outside the cottage continuously images the surrounding area with the camera 15 (step S506) and transmits the captured image to the server 4 (step S509).

Then, the server 4 performs the face recognition on the captured image through the face recognizing unit 403 (step S512), and determines whether or not the family member hands the object to the pet robot 1A (step S515).

Then, in a case in which it is determined that the family member hands the object (Yes in step S515), the pet control unit 402 transmits a command for instructing the pet robot 1A to put the object in the mouth and return to the cottage to the pet robot 1A (step S518).

Then, in accordance with the command from the server 4, the pet robot 1A moves a part corresponding to the "mouth" to hold the object handed from the family member (step S521).

Then, the pet robot 1A performs an operation of returning to the cottage while putting the object in the mouth (step S524).

Then, the cottage device 3A captures the object brought by the pet robot 1A through the camera 33 installed in the cottage (step S527) and transmits the captured image to the server 4 (step S530).

Then, the server 4 analyzes the captured image through the object recognizing unit 408 and performs object recognition (step S533).

Then, as illustrated in FIG. 14, the control unit 40 of the server 4 determine whether or not the object brought by the pet robot 1A is a predetermined printable paper medium or a predetermined 3D printable object on the basis of the object recognition result (step S536). For example, the predetermined printable paper medium or the predetermined 3D printable object is a specific paper medium or object which is registered in advance, and the control unit 40 recognizes a QR code (registered trademark) printed on the paper medium or the shape of the object and determines whether or not it is printable.

Then, in a case in which it is determined to be not printable (NO in step S536), the pet control unit 402 of the server 4 gives a return instruction to the pet robot 1A (step S560).

Then, the pet robot 1A performs an operation of coming out of the cottage while putting the object handed from the family member in the "mouth" in accordance with the return instruction (step S563).

On the other hand, in a case in which it is determined to be printable (YES in step S536), the control unit 40 of the server 4 transmits print data to the cottage device 3B (step S539). Specifically, the control unit 40 instructs the cottage device 3B to perform normal printing on a predetermined paper medium or perform 3D printing on a predetermined object.

Then, the cottage device 3B performs printing through the printer unit 35 or the 3D printer unit 36 installed inside the cottage on the basis of the received print data (step S542), and if the printing ends, the cottage device 3B transmits a print completion notification to the server 4 (step S545).

Then, if the print completion notification is received from the cottage device 3B, the pet control unit 402 of the server 4 gives a storage instruction to the cottage device 3A (step S548).

Then, in accordance with the storage instruction from the server 4, the cottage device 3A stores the object brought by the pet robot 1A to be invisible from the outside of the cottage (step S551). For example, the cottage device 3A covers a place in which the object in the cottage are placed with a cover or a door.

Then, the server 4 transmits a command for instructing the pet robot 1B to put in the primed object in the mouth and come out of the cottage to the pet robot 1B (step S554).

Then, the pet robot 1B performs the operation of putting the printed object in the mouth and coining out of the cottage in accordance with the command from the server 4 (step S557). Accordingly, it looks that the pet robot 1 conveys the object (for example, a letter or a ball) handed from the family member to the remote site. Further, there is no particular limitation on a structure of the part corresponding to the "mouth" in which the pet robot 1 put the object and a Specific structure of the inside of the cottage device 3.

3-8. Effect in which Weather is Considered

Next, a process of further emphasizing an effect in which the pet robot 1 looks to move between the remote sites will be described with reference to FIG. 15. Specifically, an effect as if the pet robot moves between the remote sites actually is emphasized by reflecting the weather between the remote sites in the state of the pet robot 1.

Figure 15:
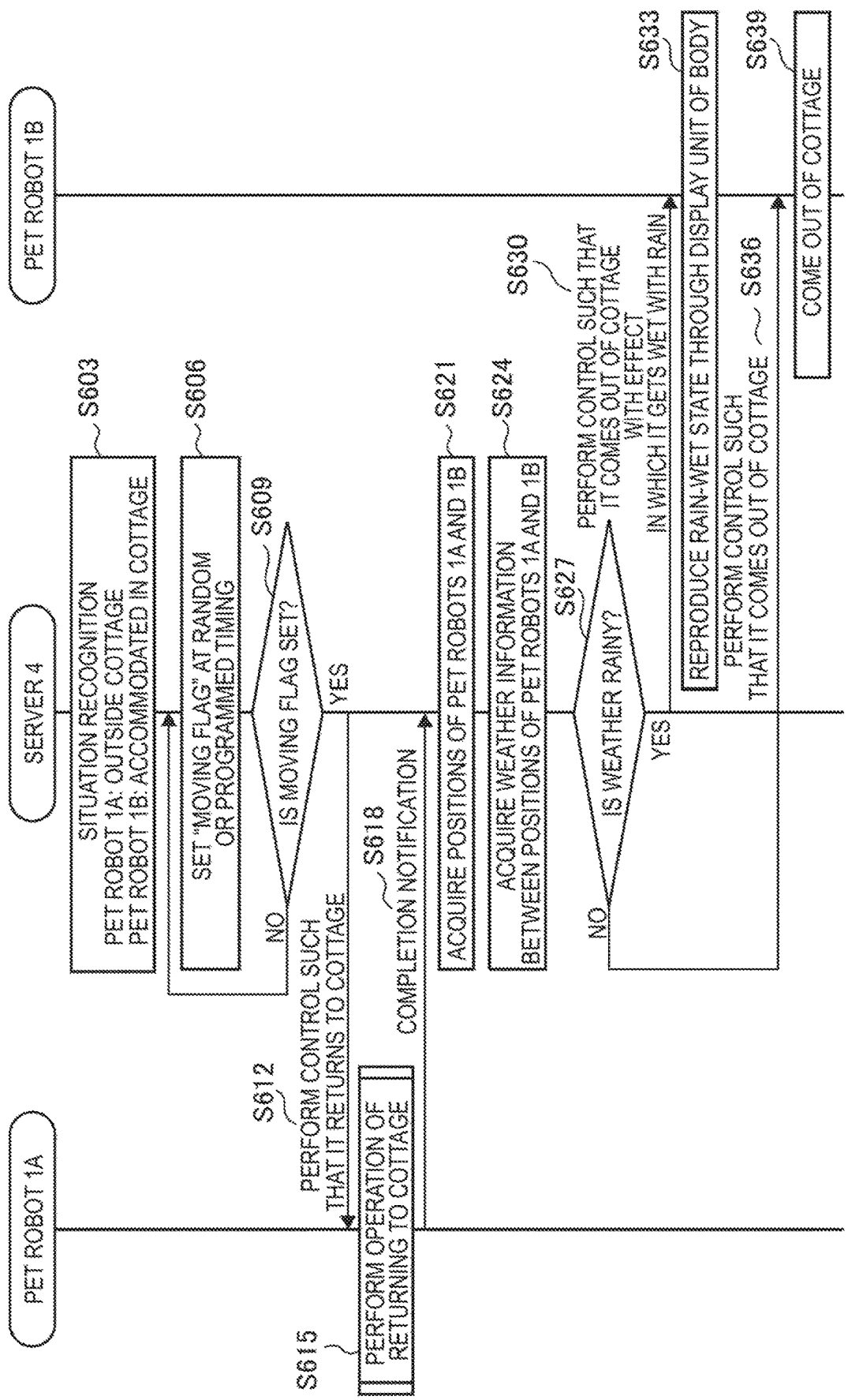
FIG. 15 is a sequence diagram illustrating an operation process for implementing an effect in which the weather is considered according to the present embodiment.

FIG. 15 is a sequence diagram illustrating an operation process for implementing an effect in which the weather is considered according to the present embodiment. As illustrated in FIG. 15, the server 4 first recognizes the situation of the pet robot 1 at each spot using the situation recognizing unit 401 (step S603). Here, for example, a situation in which the pet robot 1A at the A spot is outside the cottage, and the pet robot 1B at the B spot is accommodated in the cottage is recognized.

Then, the server 4 sets a moving flag at a random or programmed timing through the pet control unit 402 (step S606).

Then, when the moving flag is set (YES in step S609), the pet control unit 402 controls the pet robot 1A such that the pet robot 1A returns to the cottage (step S612). Specifically, the pet control unit 402 transmits a command for instructing the operation of returning to the cottage from the communication unit 41 to the pet robot 1A.

Then, the pet robot 1A performs the operation of returning to the cottage in accordance with the command from the server 4 (step S615).

Then, the pet robot 1A gives a notification indicating that the operation of returning to the cottage is completed to the server 4 (step S618).

Then, if the completion notice for the operation of returning to the cottage is received from the pet robot 1A, the server 4 acquires the positions of the pet robots 1A and 1B (step S621), and further acquires weather information between the positions of the pet robots 1A and 1B from a predetermined server (not illustrated) on the network through the weather information acquiring unit 409 (step S624).

Then, in a case in which the weather is rainy (YES in step S627), the pet control unit 402 of the server 4 performs control such that the pet robot 1B comes out of the cottage with an effect in which it gets wet with rain (step S630). Specifically, the pet control unit 402 transmits an image signal (an image of the coat wet with rain or the like) displayed on the display unit 21 installed on the surface of the pet robot 1B. Further, in a case in which the weather is snowy, the pet control unit 402 may perform control such that an effect in which snows are on the body is implemented.

Then, in accordance with the command from the server 4, the pet robot 1B reproduces the rain-wet state by displaying the rain-wet coat on the display unit 21 installed on the surface of the body (step S633), and comes out of the cottage (step S639). As described above, if it is raining between the A spot and the B spot, it can emphasize moving between the remote sites by implementing an effect in which it gets wet with rain.

On the other hand, in a case in which the weather is not rainy (NO in step S627), control is performed such that the pet robot comes out of the cottage without implementing the effect described above (step S636), and the pet robot 1B comes out of the cottage (step S639).

3-9. Operation Control According to Presence/Absence of Nearby Person

In the example described above, control is performed such that the pet robots 1 at a plurality of spots do not appear at the same time, and one pet robot 1 appears, but the present embodiment is not limited thereto. For example, "control may be performed such that the pet robots 1 at a plurality of spots looks one pet robot" in consideration of a field of view of the family member. This will be described below with reference to FIG. 16.

Figure 16:
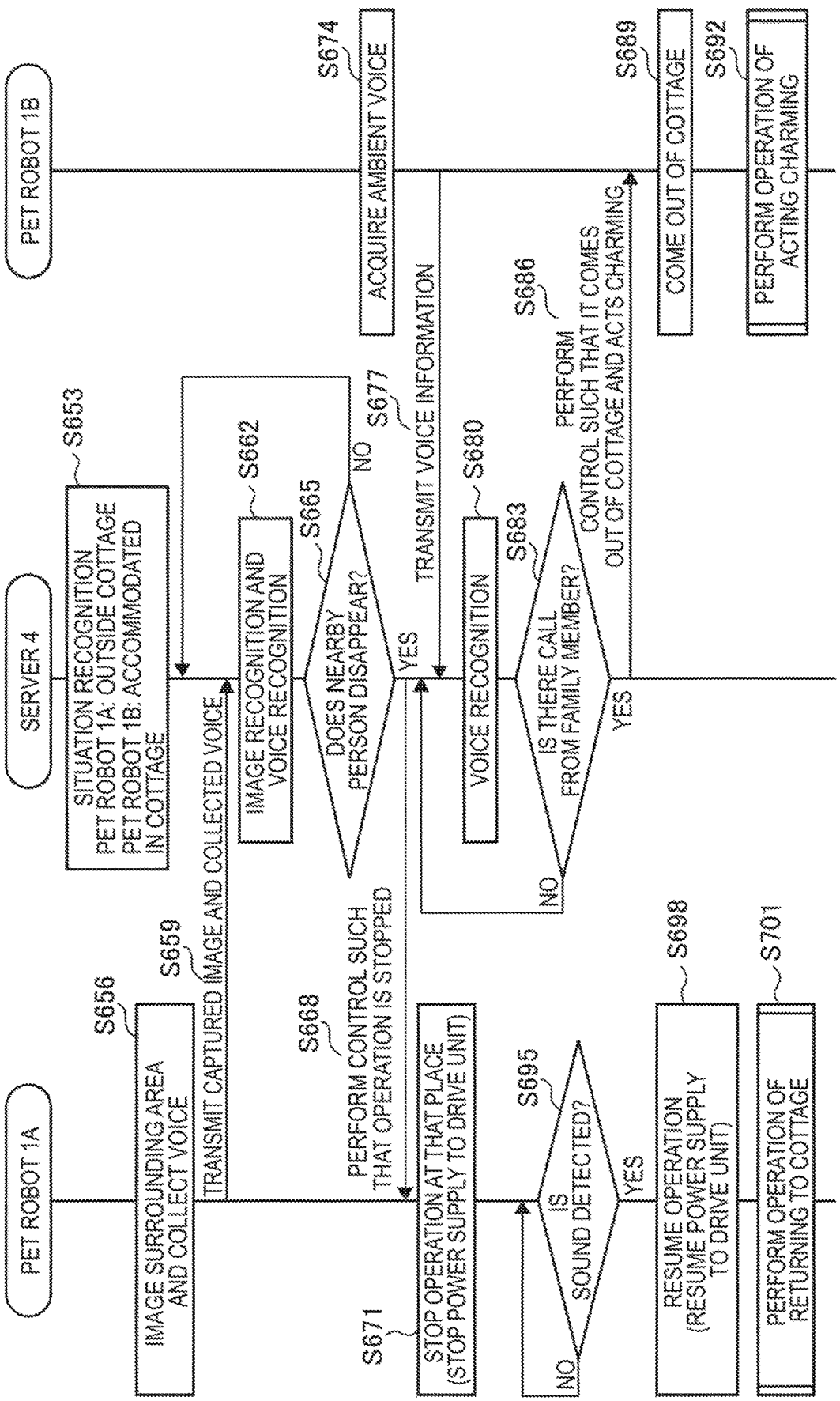
FIG. 16 is a sequence diagram illustrating an operation control process in which a field of view of a family member is considered according to the present embodiment.

FIG. 16 is a sequence diagram illustrating an operation control process in which a field of view of a family member is considered. As illustrated in FIG. 16, the server 4 first recognizes the situation of the pet robot 1 at each spot using the situation recognizing unit 401 (step S653). Here, for example, a situation in which the pet robot 1A at the A spot is outside the cottage, and the pet robot 1B at the B spot is accommodated in the cottage is recognized.

Then, the pet robot 1A outside the cottage continuously images the surrounding area with the camera 15, collects the ambient voice with the audio input unit 16 (step S656), and transmits the captured image and the collected voice to the server 4 (step S659).

Then, the server 4 performs the face recognition on the captured image through the face recognizing unit 403 and performs the voice recognition through the voice recognizing unit 404 (step S662).

Then, the control unit 40 of the server 4 determines whether or not there is a nearby person on the basis of the image recognition result and the voice recognition result (step S665).

Then, in a case in which it is determined that there is no nearby person (step YES in S665), the pet control unit 402 of the server 4 performs control such that the pet robot 1A stop moving (step S668).

Then, the pet robot 1A stops the operation at the place in accordance with the command from the server 4 (step S671). Specifically, the pet robot 1A stops power supply to the drive unit 18. In the case of the free mode, the pet robot 1 performs the operation of moving around outside the cottage, but in a case in which there is no nearby person, it is possible to prevent energy consumption by stopping the operation.

On the other hand, at the B spot, the pet robot 1B continuously acquires the ambient voice while staying in the cottage device 3B (step S674), and transmits the voice information to the server 4 (step S677).

Then, the server 4 recognizes the voice received from the pet robot 1 through the voice recognizing unit 404 (step S680).

Then, on the basis of the recognition result, the control unit 40 of the server 4 determines whether or not there is a call from the family member (step S680). Specifically, the control unit 40 recognizes whether or not the voice is a voice of the family member on the basis of the voice feature quantity of the family member (the voice quality or the like) registered in the storage unit 42, and further recognizes the call from the family member (calling of the name of the pet robot 1B or calling such as "come here!" or "come out!").

Then, in a case in which it is determined that the family member has been called (YES in step S683), the pet control unit 402 of the server 4 transmits a command instructing the pet robot 1B to exit from cottage and perform the operation of acting charming (step S686).

Then, in accordance with the command from the server 4, the pet robot 1B comes out of the cottage device 3B (step S689) and performs the operation of acting charming to the family member (step S692). At this time point, the pet robots 1 appears simultaneously from the cottage devices 3 at both of the A spot and the B spot, but the pet robot 1A is not visually recognized by the family member because there is a nearby person at the A spot. Therefore, a problem does not occur in "control for causing the pet robots to look one pet robot," and it is possible to implement energy saving by stopping driving of the pet robot 1A.

Further, on the A spot side, the pet robot 1A continually detects the ambient sound (step S695).

Then, in a case in which the sound is detected (YES in step S695), the pet robot 1A resumes the operation, that is resumes the power supply to the drive unit 18 (step S698), and performs the operation of returning to the cottage device 3A (step S701). Accordingly, in a case in which family member comes back, since the pet robot 1A is accommodated in the cottage device 3A, it is possible to solve the situation in which the pet robots 1 simultaneously appears at a plurality of spots.

3-10. Operation Control According to Visually Recognized Situation

In the operation control according to the presence or absence of the nearby person described above, since the pet robot 1 is not visible to the family member if there is no nearby person, although the pet robots 1 appear at the same time at a plurality of spots, a problem does not occur. However, in a case in which a security camera, a surveillance camera, or the like is installed, the user is likely to notice that the pet robots 1 appear at the same time later. In this regard, in the present embodiment, operation control is performed in consideration of the visually recognized situation such that a problem does not occur in "control causing pet robots to look one pet robot." This will be described below with reference to FIG. 17.

Figure 17:
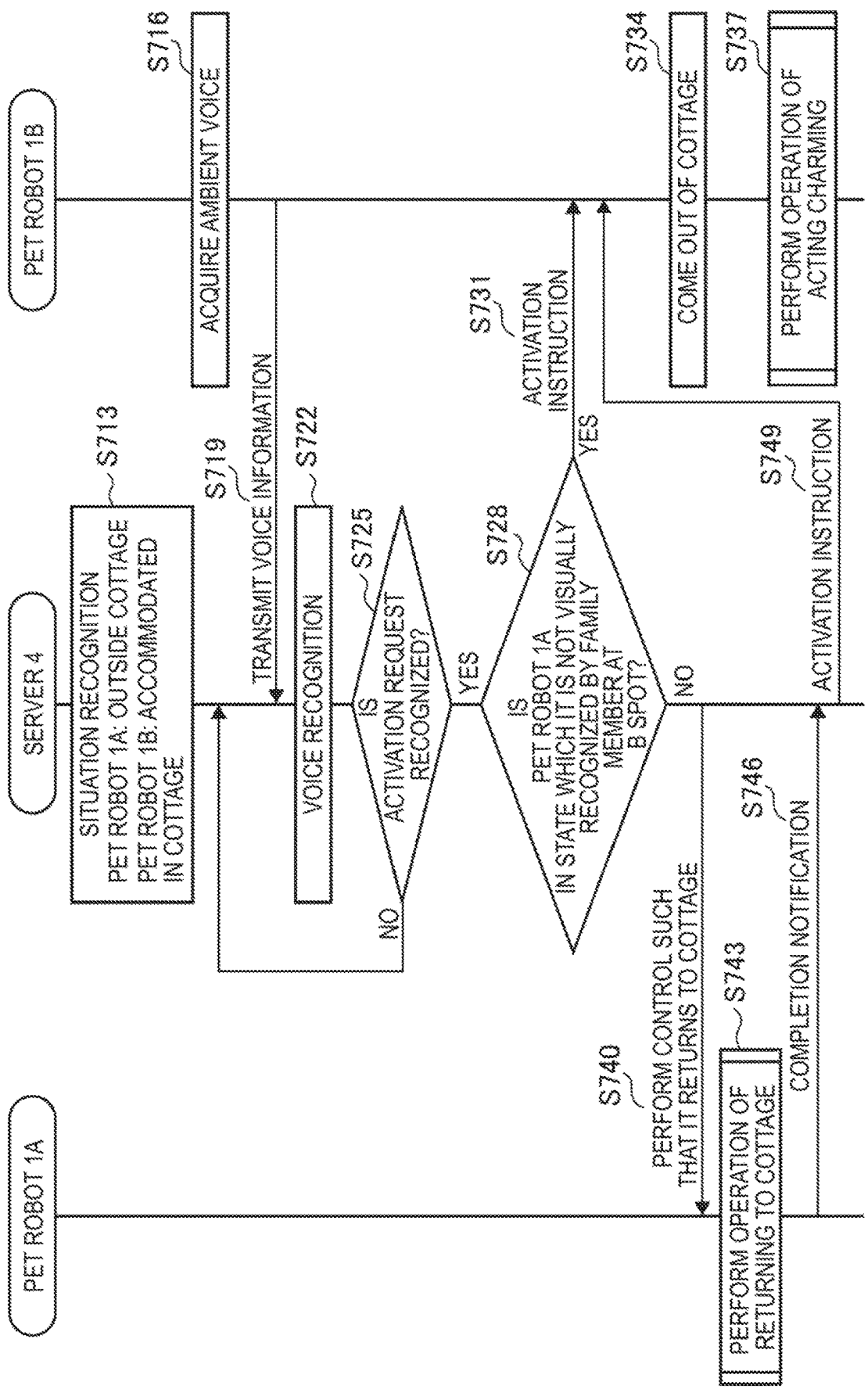
FIG. 17 is a flowchart illustrating an operation control process according to a visually recognized situation according to the present embodiment.

FIG. 17 is a flowchart according to a visually recognized situation. As illustrated in FIG. 17, the server 4 first recognizes the situation of the pet robot 1 at each spot using the situation recognizing unit 401 (step S713). Here, for example, a situation in which the pet robot 1A at the A spot is outside the cottage, and the pet robot 1B at the B spot is accommodated in the cottage is recognized.

Then, the pet robot 1B continuously acquires ambient voices while staying in the cottage device 3B (step S716), and transmits the voice information to the server 4 (step S719).

Then, the server 4 recognizes the voice received from the pet robot 1 through the voice recognizing unit 404 (step S722).

Then, the control unit 40 of the server 4 determines whether or not there is an activation request (a call from the family member. For example, calling of the name of the pet robot 1B or calling such as "come here!" or "come out!") from the family member (step S725).

In a case in which it is determined that there is an activation request (YES in step S725), the control unit 40 of the server 4 determines whether or not the pet robot 1A is in the state which it is visually recognized by the family member at the B spot (step S728). For example, in a case in which information of the security camera or the surveillance camera installed at the A spot can be acquired by the system, since the control unit 40 determines that the pet robot 1A is in the state which it is visually being recognized by the family member at the B spot since the pet robot 1A is likely to be visually recognized by the family member at the B spot. More specifically, for example, a live camera is assigned to be installed as a service for watching an elder couple living at the A spot. In this case, since a daughter family living at the B spot can see a video of the live camera, the simultaneous appearance of the pet robots 1 is likely to be recognized. Further, since the live camera is assumed to be installed at both spots, the control unit 40 may determine whether or not the pet robot 1B at the B spot is in the state in which it is not visually recognized by the family member at the A spot together.

Then, in a case in which it is determined that the pet robot 1A is in the state which it is not visually being recognized by the family member at the B spot (that the security camera or the like is not installed) (YES in step S728), the pet control unit 402 of the server 4 transmits a command for an activation instruction (specifically, for example, an instruction to come out of the cottage and performing the operation of acting charming) to the pet robot 1B (step S731).

Then, in accordance with the command from the server 4, the pet robot 1B comes out of the cottage device 3B (step S734) and performs the operation of acting charming to the family member (step S737). At this time point, the pet robots 1 simultaneously appear from the cottage devices 3 at both the A spot and the B spot, but since the family member at the B spot is unable to visually recognize the pet robot 1A appearing at the A spot, they can be recognized as one pet robot.

On the other hand, in a case in which it is determined that the pet robot 1A is in the state which it is visually being recognized by the family member at the B spot (that the security camera or the like is installed) (NO in step S728), the pet control unit 402 of the server 4 performs control such that the pet robot 1A returns to the cottage (enters the sleep state) (step S740).

Then, the pet robot 1A performs the operation of returning to the cottage in accordance with the command from the server 4 (step S743), and gives the notification indicating that the operation of returning to the cottage is completed to the server 4 (step S746).

Then, the pet control unit 402 of the server 4 receives the completion notice for the operation of returning to the cottage from the pet robot 1A, and then transmits the command of the activation instruction to the pet robot 1B (step S749). In accordance with the command from the server 4, the pet robot 1B comes out of the cottage device 3B (step S734) and performs the operation of acting charming to the family member (step S737).

The operation control according to the visually recognized situation has been described above. Further, in a case in which a setting to strictly prohibit simultaneous appearance is performed in advance, regardless of the visually recognized situation, the server 4 performs the operation process illustrated in FIG. 7 described above, so that the simultaneous appearance of the pet robots 1 at a plurality of spots is prevented.

Communication Between a Plurality of Spots

As a case in which it is recognized that the respective pet robots 1 simultaneously appear at a plurality of spots, in addition to the case in which the security camera, the surveillance camera, or the like described above are installed, a case in which communication such as a telephone call is performed between the family members at a plurality of spots is assumed. For example, when the family member at the A spot and the B spot are talking on the phone (a voice call or a video call), if the pet robots 1 at both spots come out of the cottages, there is a possibility of the occurrence of contradiction in conversation. In this regard, in the present embodiment, in a case in which the pet robots simultaneously appear, and communication is performed between a plurality of spots, the contradiction can be resolved by performing control such that one pet robot 1 returns to the cottage. This will be described in detail with reference to FIG. 18.

Figure 18:
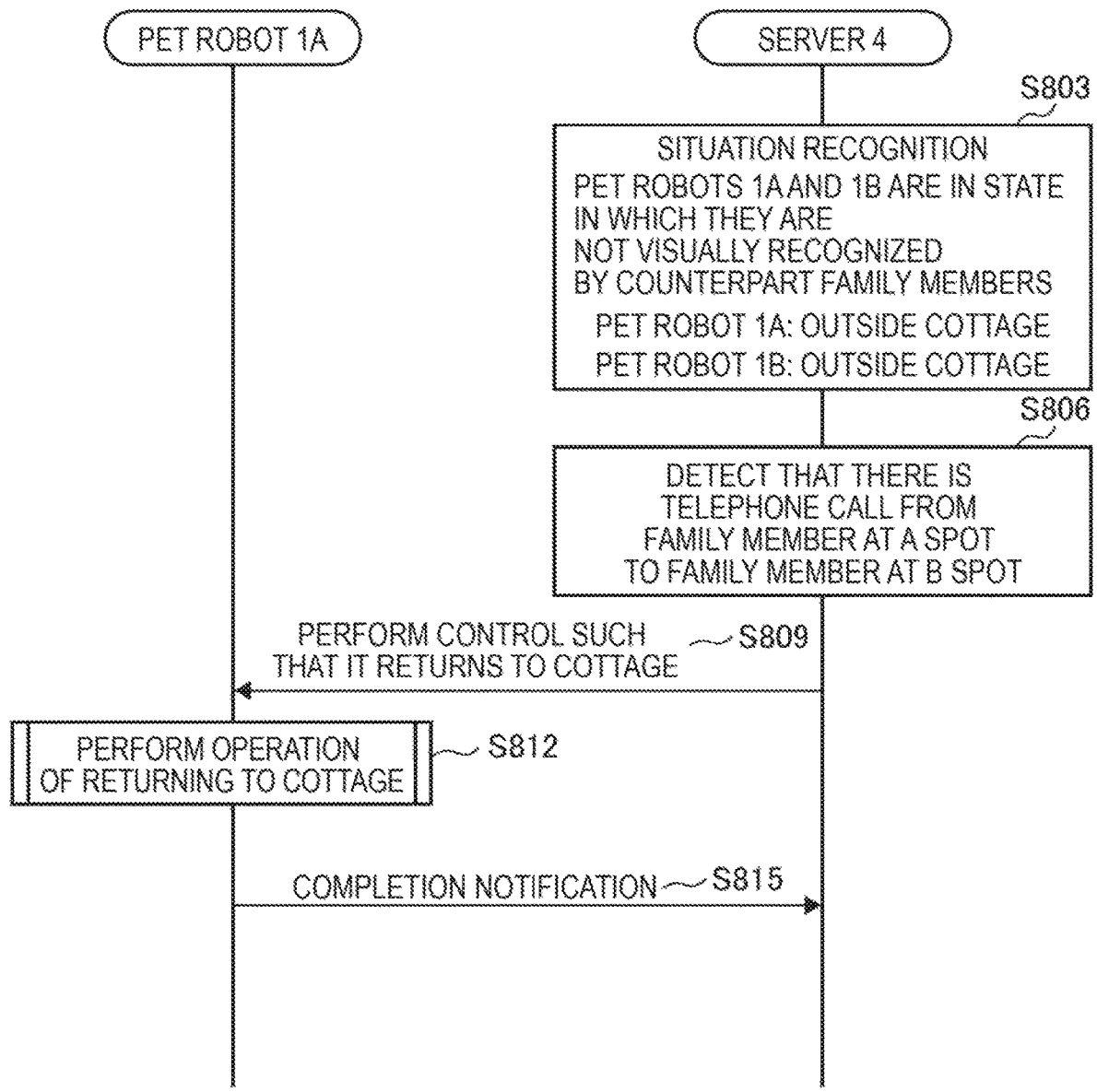
FIG. 18 is a sequence diagram illustrating an operation control process when communication occurs between a plurality of spots according to the present embodiment.

FIG. 18 is a sequence diagram illustrating an operation control process when communication occurs between a plurality of spots according to the present embodiment. As illustrated in FIG. 18, the server 4 first recognizes the situation of the pet robot 1 at each spot through the situation recognizing unit 401 (step S803). Here, for example, a situation in which the pet robot 1A at the A spot is outside the cottage, and the pet robot 1B at the B spot comes out of the cottage is recognized.

Then, the server 4 detects that there is a telephone call from the family member at the A spot to the family member at the B spot (step S806). The server 4 can detect that communication such as a telephone call occurs between the remote sites in conjunction with, for example, a smartphone.

Then, the pet control unit 402 of the server 4 performs controls such that either of the pet robots 1A and 1B, here, for example, the pet robot 1A returns to the cottage (step S809). The pet robot selected from among a plurality of pet robots 1 is decided randomly or in accordance with a program.

Then, the pet robot 1A performs the operation of returning to the cottage in accordance with the control from the server 4 (step S812), and gives the notification indicating that the operation of returning to the cottage is completed to the server 4 (step S815).

Accordingly, in a case in which communication occurs between a plurality of spots in the situation in which the pet robots 1 at a plurality of spots simultaneously appears, it is possible to prevent the occurrence of contradiction related to the presence of the pet robot during the communication by performing control such that only one pet robot remains, and the other pet robots excluding returns to the cottage.

3-11. Operation Control According to Communication Between a Plurality of Spots In the present embodiment, it is also possible to inform the remote site of the occurrence of such communication through the pet robot 1 in a case in which communication such as a telephone call or the like occurs between a plurality of spots. This will be described in detail with reference to FIG. 19.

FIG. 19 is a sequence diagram illustrating an operation control process of giving a communication occurrence notification through the pet robot 1 according to the present embodiment. As illustrated in FIG. 19, the server 4 first recognizes the situation of the pet robot 1 at each spot through the situation recognizing unit 401 (step S853). Here, for example, a situation in which the pet robot 1A at the A spot is outside the cottage, and the pet robot 1B at the B spot is accommodated in the cottage is recognized.

Then, the server 4 detects, for example, that there is a telephone call (a voice call or a video call) from the family member at the A spot to the family member at the B spot (step S856). The server 4 can detect that communication such as a telephone call occurs between the remote sites in conjunction with, for example, a smartphone.

Then, the pet control unit 402 of the server 4 performs control such that the pet robot 1A at the spot in which the caller is located returns to the cottage for (step S859).

Then, the pet robot 1A performs the operation of returning to the cottage in accordance with the control from the server 4 (step S862), and gives the notification indicating that the operation of returning to the cottage is completed to the server 4 (step S865).

Then, if the completion notification for the operation of returning to the cottage is received from the pet robot 1A, the server 4 transmits a command for instructing the pet robot 1B to come out of the cottage and give a notification indicating an incoming call to the pet robot 1B (step S868). In a case in which the notification indicating the incoming call is given through a sound output, the server 4 generates a speaking voice or a barking sound through the voice synthesizing unit 406, and transmits the speaking voice or the barking sound to the pet robot 1B together with the command.

Then, the pet robot 1B comes out of the cottage device 3B in accordance with the command from the server 4 (step S871), and give the notification indicating the incoming call the family member through barking (step S874). Accordingly; it is possible to implement an effect as if one pet robot 1 moves front the A spot to the B spot and conveys the call from the A spot.

4. Conclusion

As described above, in the information processing system according to the embodiment of the present disclosure, it is possible to control a plurality of virtual creatures in conjunction and promote indirect communication among a plurality of spots using the virtual creatures.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to create a computer program causing hardware such as a CPU, a ROM, and a ROM installed in each of the pet robot 1, the cottage device 3, and the server 4 of the information processing system described above to perform the functions of the information processing system. Further, a computer readable storage medium having the computer program stored therein is also provided.

Further, in the above embodiments, the control for the respective pet robots 1A and 1B at the two spots such as the A spot and the B spot has been mainly described, but the present embodiment is not limited thereto, and control for respective (three) pet robots 1A and 1B at two or more spots, for example, an A spot, a B spot, or a C spot can be similarly controlled as well.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A virtual creature control system, including:

a communication unit configured to receive information of current states of a plurality of virtual creatures and transmit a signal for controlling operations the plurality of virtual creatures, at least one virtual creature among the plurality of virtual creatures being hardware; and a control limit configured to generate a signal for controlling an operation of the at least one virtual creature among the plurality of virtual creatures such that the plurality of virtual creatures are not visually recognized at a same time by a specific user and control the communication unit such that the signal is transmitted to the one virtual creature.

(2)

The virtual creature control system according to (1), in which, if information of the current slate indicating that a first virtual creature enters a sleep state in which the first virtual creature is not visually recognized by the specific user is received through the communication unit, the control unit transmits a signal for permitting activation to a second virtual creature in a sleep state through the communication unit.

(3)

The virtual creature control system according to (2), in which the first virtual creature is a robot, and the sleep state is a state in which the first virtual creature autonomously moves into an accommodating unit such that the first virtual creature is not visually recognized by the specific user.

(4)

The virtual creature control system according to (2), in which the first virtual creature is a software program, and the sleep state is a state in which the first virtual creature displayed on a display unit of a device in which the software program is installed disappears from the display unit such that the first virtual creature is not visually recognized by the specific user.

(5)

The virtual creature control system according to (2) or (3), in which the first virtual creature is in an activated state, and the second virtual creature is in the sleep state, the first virtual creature is able to autonomously move into an accommodating unit such that the first virtual creature is not visually recognized by the first user while holding an object handed to it by a first user, the communication unit receives a captured image obtained by imaging the object held by the first virtual creature, the control unit recognizes the held object on a basis of the captured image, transmits data for reproducing the object to the accommodating unit in which the second virtual creature is accommodated, and gives an instruction to reproduce the object through a reproducing unit installed in the accommodating unit, and the control unit transmits a control signal for permitting activation and further giving an instruction to come out of the accommodating unit while holding the object reproduced by the reproducing unit to the second virtual creature.

(6)

The virtual creature control system according to (2) or (3), in which the first virtual creature is in an activated state, and the second virtual creature is in the sleep state, the control unit manages current positions of the first virtual creature and the second virtual creature and is able to acquire weather information between respective spots, and if the information of the current state indicating that the first virtual creature enters a sleep state in which the first virtual creature is not visually recognized by the specific user is received through the communication unit, the control unit transmits a signal for permitting activation and an image signal to be displayed on a display unit installed on a surface of the second virtual creature according to the weather information between the respective spots to the second virtual creature in the steep state through the communication unit.

(7)

The virtual creature control system according to (2) or (3), in which the communication unit receives knowledge about a user learned by the first virtual creature, and the control unit controls the communication unit such that a signal for controlling an operation of a second virtual creature generated on a basis of the knowledge is transmitted to the second virtual creature through the communication unit.

(8)

The virtual creature control system according to (7), in which the control unit transmits a control signal for giving an instruction to take a randomly selected pose in response to calling of a first user to the first virtual creature, the control unit receives feedback of the first user on the pose as the knowledge about the user learned by the first virtual creature through the communication unit, and the control unit stores the randomly selected pose in association with the calling in accordance with the feedback.

(9)

The virtual creature control system according to (7), in which the control unit receives a face image of the first user captured by the first virtual creature as the knowledge about the user learned by the first virtual creature through the communication unit, and the control unit stores a recognition result for the face image.

(10)

The virtual creature control system according to (9), in which, in a case in which a person shown together with the stored first user is recognized front the captured image captured by the first virtual creature, the control unit stores a recognition result for a face of the person.

(11)

The virtual creature control system according to (2) or (3), in which, when the first virtual creature is in an activated state, and the second virtual creature is in the sleep state, when information of a current state of the second virtual creature received through the communication unit indicates an activation request from the specific user, and information of a current stale of the first virtual creature indicates that the current state of the first virtual creature is not a state seen by the specific user, the control unit transmits a signal for permitting activation to the second virtual creature without transmitting a control signal for giving an instruction to enter the sleep state to the first virtual creature through the communication unit.

(12)

The virtual creature control system according to (11), in which, when there is a camera configured to monitor any one of the first and second virtual creatures, the control unit transmits a control signal for giving an instruction to enter the sleep state to the first virtual creature through the communication unit, and transmits a signal for permitting activation to the second virtual creature.

(13)

The virtual creature control system according to (11), in which, when it is detected that a first user near the first virtual creature makes a communication request to a second user near the second virtual creature, the control unit transmits a control signal for giving an instruction to enter the sleep state to the first virtual creature through the communication unit.

(14)

The virtual creature control system according to (2) or (3), in which, if it is detected that a first user near the first virtual creature makes a communication request to a second user near the second virtual creature, the control unit transmits a control signal for giving an instruction to enter the sleep state to the first virtual creature through the communication unit, and further, if information of the current state indicating that the first virtual creature is in the sleep state is received through the communication unit, the control unit transmits a signal of permitting activation and a control signal for giving an instruction to give a notification indicating that there is a communication request from the first user to the second user to the second virtual creature through the communication unit.

(15)

The virtual creature control system according to (2) or (3), in which, when the first virtual creature is in an activated state, when information of the current state of the first virtual creature received through the communication unit indicates that there is no nearby user, the control unit transmits a control signal for giving an instruction to stop an operation to the first virtual creature through the communication unit, and when the information of the current state of the first virtual creature indicates that a voice of a predetermined level or higher is detected in a state in which the operation is stopped, the control unit transmits a signal of permitting activation to the first virtual creature through the communication unit.

(16)

The virtual creature control system according to (1), in which any one virtual creature among the plurality of virtual creatures is in an activated state, and other virtual creatures are in sleep state, the control unit continuously sets a moving flag at a predetermined tinting, the control unit transmits a control signal for giving an instruction to enter the sleep state to the virtual creature in the activated state when the moving flag is set, and if the information of the current state indicating that the virtual creature in the activated state enters the sleep state in accordance with the control signal is received, the control unit transmits a control signal for permitting activation to any one virtual creature among the other virtual creatures in the sleep state.

(17)

A virtual creature control system, including:

a plurality of virtual creatures, at least one virtual creature among the plurality of virtual creatures being hardware:

a communication unit configured to receive information of current states of the plurality of virtual creatures and transmit a signal for controlling operations of the plurality of virtual creatures; and a control unit configured to generate a signal for controlling an operation of the at least one virtual creature among the plurality of victual creatures such that the plurality of virtual creatures are not visually recognized at a same time by a specific user and control the communication unit such that the signal is transmitted to the one virtual creature.

(18)

A virtual creature control method, including;

causing, by a processor, a communication unit to receive information of current states of a plurality of virtual creatures and transmit a signal for controlling operations the plurality of virtual creatures, at least one virtual creature among the plurality of virtual creatures being hardware; and generating, by the processor, a signal for controlling an operation of the at least one virtual creature among the plurality of virtual creatures such that the plurality of virtual creatures are not visually recognized at a same time by a specific user and controlling the communication unit such that the signal is transmitted to the one virtual creature.

REFERENCE SIGNS LIST 1, 1A, 1B pet robot
3, 3A, 3B cottage device
4 server
5 network
7 display terminal
10 control unit
11 Wi-Fi communication unit
12 LTE communication unit
13 Bluetooth communication unit
14 position information acquiring unit
15 camera
16 audio input unit
18 drive unit
19 touch sensor
20 storage unit
21 display unit
22 audio output unit
23 acceleration sensor
24 angular velocity sensor
30 control unit
31 Wi-Fi communication unit
32 Bluetooth communication unit
33 camera
34 storage unit
35 printer unit
36 3D printer unit
37 charging unit
40 control unit
41 communication unit
42 storage unit
401 situation recognizing unit
402 pet control unit
403 face recognizing unit
404 voice recognizing unit
406 voice synthesizing unit
407 operation learning unit
408 object recognizing unit
409 weather information acquiring unit

The invention claimed is:

1. A virtual creature management server, comprising:
processing circuitry configured to:
receive information indicating current states of a plurality of virtual creatures implemented by hardware devices, respectively, the hardware devices being communicatively coupled with the server, the plurality of virtual creatures being configured to be physically arranged at different spots while visually recognized as a same creature;
generate, according to the current states of the plurality of virtual creatures, at least one signal for controlling an operation of at least one virtual creature among the plurality of virtual creatures, such that at most one of the plurality of virtual creatures is visually recognizable at a time; and
transmit the at least one signal to the at least one virtual creature.

2. The virtual creature management server according to claim 1, wherein the processing circuitry is configured to:
when the information indicates that a first virtual creature enters a sleep state corresponding to being not visually recognizable,
transmit a first control signal to a second virtual creature that is in the sleep state, the first control signal setting the second virtual creature to an activation state corresponding to being visually recognizable.

3. The virtual creature management server according to claim 2, wherein
the first virtual creature is implemented by a first hardware device as a real robot, and
the first virtual creature enters the sleep state when the real robot moves into an accommodating unit such that the first virtual creature is not visually recognizable.

4. The virtual creature management server according to claim 2, wherein the first virtual creature is implemented by a first hardware device as a virtual entity on a display of the first hardware device, and the first virtual creature enters the sleep state when the virtual entity disappears from the display such that the first virtual creature is not visually recognizable.

5. The virtual creature management server according to claim 2, wherein
prior to the information is received by the processing circuitry, the first virtual creature is in the activation state, and the second virtual creature is in the sleep state,
the first virtual creature is configured to move into a first accommodating unit such that the first virtual creature is not visually recognizable while holding an object provided by a first user, and
the processing circuitry is further configured to:
receive a captured image obtained by imaging the object held by the first virtual creature;
recognize the object on a basis of the captured image;
transmit data for reproducing the object to a second accommodating unit in which the second virtual creature is accommodated;
cause a reproducing unit installed in the second accommodating unit to reproduce a copy of the object according to the data; and
transmit the first control signal and instruct the second virtual creature to come out of the second accommodating unit while holding the copy of the object that is reproduced by the reproducing unit.

6. The virtual creature management server according to claim 2, wherein the processing circuitry is further configured to:
acquire weather information regarding current positions of the first virtual creature and the second virtual creature; and
when the information indicates that the first virtual creature enters the sleep state,
transmit the first control signal and transmit, according to the weather information, an image signal to be displayed on a display of a second hardware by which the second virtual creature is implemented.

7. The virtual creature management server according to claim 2, wherein the processing circuitry is configured to:
receive knowledge information about a user learned by the first virtual creature; and
generate a second control signal for controlling an operation of the second virtual creature on a basis of the knowledge information.

8. The virtual creature management server according to claim 7, wherein the processing circuitry is configured to:
instruct the first virtual creature to take a pose in response to a calling of the user, the pose being randomly selected;
receive feedback of the user on the pose as the knowledge information about the user learned by the first virtual creature; and
store the pose in association with the calling in accordance with the feedback.

9. The virtual creature management server according to claim 7, wherein the processing circuitry is configured to:
receive a face image of the first user captured by the first virtual creature as the knowledge information about the user learned by the first virtual creature; and
register the user according to a recognition result for the face image.

10. The virtual creature management server according to claim 9, wherein the processing circuitry is configured to:
in a case that a person shown together with the user is recognized from a captured image captured by the first virtual creature as a previously registered user, register the user as a family member of the person.

11. The virtual creature management server according to claim 2, wherein the processing circuitry is configured to:
when the first virtual creature positioned at a first spot is in the activation state, and the second virtual creature positioned at a second spot is in the sleep state, and
when the information indicates that the second virtual creature receives an activation request from a user at the second spot, and the first virtual creature is not visually recognizable by the user at the second spot,
transmit the first control signal to the second virtual creature for setting the second virtual creature to the activation state before transmitting a second control signal to the first virtual creature for instructing the first virtual creature to enter the sleep state.

12. The virtual creature management server according to claim 2, wherein the processing circuitry is configured to:
when the first virtual creature is in the activation state, and
when the information indicates that the first virtual creature has no nearby user,
transmit a second control signal to the first virtual creature to stop an operation; and
when the information indicates that the first virtual creature has detected a voice of a predetermined level or higher while the operation is stopped,
transmit a third control signal to the first virtual creature to resume the operation.

13. The virtual creature management server according to claim 1, wherein the processing circuitry is configured to:
receive image information from a camera configured to monitor a particular one of the plurality of virtual creatures; and
control the plurality of virtual creatures according to the information indicating the current states of the plurality of virtual creatures and according to the image information from the camera configured to monitor the particular one of the plurality of virtual creatures.

14. The virtual creature management server according to claim 2, wherein the processing circuitry is configured to:
when it is detected that a first user near the first virtual creature makes a communication request to a second user near the second virtual creature, transmit a second control signal instructing the first virtual creature to enter the sleep state.

15. The virtual creature management server according to claim 14, wherein the processing circuitry is configured to:
when the information indicates that the first virtual creature is in the sleep state,
transmit the first control signal to the second virtual creature for setting the second virtual creature to the activation state and transmit a third control signal notifying the second virtual creature that there is the communication request from the first user to the second user.

16. The virtual creature management server according to claim 2, wherein the processing circuitry is configured to:
set a moving flag at a predetermined timing;
transmit a second control signal to instruct the first virtual creature that is in the activation state to enter the sleep state; and
when the information indicating that the first virtual creature enters the sleep state in accordance with the second control signal is received, transmit the first control signal to instruct the second virtual creature that is the sleep state to enter the activation state.

17. A virtual creature control system, comprising:
a plurality of hardware devices, a plurality of virtual creatures being implemented by the hardware devices, respectively, the plurality of virtual creatures being configured to be physically arranged at different spots while visually recognized as a same creature; and
a virtual creature management server communicatively coupled with the plurality of hardware devices, the virtual creature management server comprising processing circuitry configured to:
receive information indicating current states of the plurality of virtual creatures;
generate, according to the current states of the plurality of virtual creatures, at least one signal for controlling an operation of at least one virtual creature among the plurality of virtual creatures, such that at most one virtual creature of the plurality of virtual creatures is visually recognizable at a time; and
transmit the at least one signal to the at least one virtual creature.

18. A virtual creature control method, comprising:
receiving, by processing circuitry of a virtual creature management server, information indicating current states of a plurality of virtual creatures implemented by hardware devices, respectively, the hardware devices being communicatively coupled with the server, the plurality of virtual creatures being configured to be physically arranged at different spots while visually recognized as a same creature;
generating, by the processing circuitry according to the current states of the plurality of virtual creatures, at least one signal for controlling an operation of at least one virtual creature among the plurality of virtual creatures, such that at most one of the plurality of virtual creatures is visually recognizable at a time; and
transmitting the at least one signal to the at least one virtual creature.

* * * * *